US012253276B2

(12) United States Patent
Park et al.

(10) Patent No.: US 12,253,276 B2
(45) Date of Patent: Mar. 18, 2025

(54) VENTILATION APPARATUS WITH TOTAL HEAT EXCHANGER

(71) Applicant: LG ELECTRONICS INC., Seoul (KR)

(72) Inventors: Janghee Park, Seoul (KR); Jinwoo Lee, Seoul (KR); Yongki Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 18/099,734

(22) Filed: Jan. 20, 2023

(65) Prior Publication Data

US 2024/0060677 A1    Feb. 22, 2024

(30) Foreign Application Priority Data

Aug. 19, 2022   (KR) .......................... 10-2022-0104150

(51) Int. Cl.
| F24F 11/00 | (2018.01) |
| F24F 3/00 | (2006.01) |
| F24F 11/74 | (2018.01) |
| F24F 11/77 | (2018.01) |
| F24F 12/00 | (2006.01) |
| F24F 13/10 | (2006.01) |
| F24F 13/20 | (2006.01) |
| F24F 13/30 | (2006.01) |
| F24F 11/65 | (2018.01) |

(52) U.S. Cl.
CPC ............ *F24F 12/006* (2013.01); *F24F 3/001* (2013.01); *F24F 11/74* (2018.01); *F24F 11/77* (2018.01); *F24F 13/20* (2013.01); *F24F 13/30* (2013.01); *F24F 11/65* (2018.01); *F24F 2012/007* (2013.01)

(58) Field of Classification Search
CPC .......................... F24F 12/001; F24F 2012/007
See application file for complete search history.

(56) References Cited

U.S. PATENT DOCUMENTS

| 2006/0199510 A1* | 9/2006 | Choi ...................... F24F 12/006 |
| | | 454/237 |
| 2023/0055517 A1 | 2/2023 | Choi et al. |

FOREIGN PATENT DOCUMENTS

| CN | 107143945 A | 9/2017 |
| DE | 30 47 890 A1 | 7/1982 |

(Continued)

*Primary Examiner* — Jerry-Daryl Fletcher
*Assistant Examiner* — Daniel C Comings
(74) *Attorney, Agent, or Firm* — Birch, Stewart, Kolasch & Birch, LLP

(57) ABSTRACT

A ventilation apparatus includes a housing having an indoor air inlet, an air discharge opening, an outdoor air inlet, and an indoor air outlet; a total heat exchanger located in the housing, an inner space of the housing being partitioned into a space for the total heat exchange element, an outdoor air inlet space, an outdoor air discharge space facing the outdoor air inlet space, an indoor air inlet space, and an indoor air discharge space facing the indoor air inlet space, a bypass duct having a bypass passage configured to bypass the total heat exchange element, the bypass passage communicating with the indoor air inlet space and the indoor air discharge space. Indoor air passes through at least one of the total heat exchanger and the bypass passage according to an operation mode of the ventilation apparatus.

20 Claims, 20 Drawing Sheets

(56) References Cited

FOREIGN PATENT DOCUMENTS

| | | |
|---|---|---|
| DE | 44 08 096 A1 | 9/1994 |
| JP | 2004-3869 A | 1/2004 |
| KR | 10-2118791 B1 | 6/2020 |
| KR | 10-2124364 B1 | 6/2020 |
| KR | 10-2283668 B1 | 7/2021 |
| KR | 10-2388854 B1 | 4/2022 |
| WO | WO-2009128151 A1 * 10/2009 | ............ F24F 12/006 |
| WO | WO-2011155069 A1 * 12/2011 | .............. F24F 11/81 |

* cited by examiner

VENTILATION APPARATUS WITH TOTAL HEAT EXCHANGER

CROSS-REFERENCE TO RELATED APPLICATION

The present application claims the benefits of priority to Korean Patent Application No. 10-2022-0104150, filed on Aug. 19, 2022, of which is incorporated herein by reference in its entirety.

BACKGROUND

1. Field

The present disclosure relates to a ventilation apparatus.

2. Description of the Related Art

A ventilation apparatus is an apparatus for discharging indoor air to the outside and supplying fresh outdoor air to the indoor space, and the main component of the ventilation apparatus is a total heat exchanger that allows only heat exchange without mixing the discharged indoor air and the introduced outdoor air.

Recently, a complex ventilation apparatus capable of performing a cooling function in addition to a ventilation function through total heat exchange has emerged.

Korean Patent Registration No. 10-2118791 (May 28, 2020) discloses a complex ventilation apparatus in which a refrigeration system that forms a cooling cycle using a refrigerant inside the ventilation apparatus is mounted.

In the ventilation apparatus disclosed in the prior art, the components for cooling and heating, that is, a compressor, a condenser (second heat exchanger), and an evaporator (first heat exchanger) are installed inside the ventilation apparatus, and a damper (defined as a second damper) is provided for quick cooling in which discharged indoor air passes through the evaporator rather than the total heat exchanger and then flows back into the indoor space.

The conventional complex ventilation apparatus having the above-described structure has the following disadvantages.

First, since a passage for discharging contaminated indoor air directly to the outside without passing through the total heat exchanger is not provided inside the ventilation apparatus, there is a disadvantage in that the life of the total heat exchanger is shortened. For example, if fish or meat is cooked, indoor air containing odors and smoke passes through the total heat exchange element, and thus, animal fat with high viscosity is adsorbed on the surface of the total heat exchange element. This adsorption phenomenon increases the flow resistance of the exhausted indoor air and acts as a factor of lowering the total heat exchange efficiency with the introduced outdoor air.

Although an indoor air filter is mounted on the side of a total heat exchanger communicating with an indoor air exhaust space, so that the exhausted indoor air is purified. However, it is impossible to prevent the indoor air from passing through the total heat exchanger. In this case, the life of the total heat exchanger can be extended, but there is a disadvantage in that the indoor air filter has to be replaced periodically.

Second, since the indoor air discharged to the outside has to pass through the total heat exchange element, the outdoor air passing through the total heat exchanger absorbs heat from the discharged indoor air when the indoor temperature is higher than the outdoor temperature. As a result, since fresh air with a relatively low temperature cannot be supplied to the indoor space, there is a disadvantage in that a user does not feel a ventilation effect in summer.

Third, in the prior art, since air is purified while the introduced outdoor air passes through the total heat exchanger and then passes through various filters, various contaminants including dust may be accumulated inside the total heat exchange element, and harmful bacteria may proliferate while being attached to the surface of the total heat exchange element.

SUMMARY

The present disclosure is proposed to solve the above problems.

To achieve the above objects, a ventilation apparatus according to an embodiment of the present disclosure includes: a housing including a front surface having an indoor air inlet and an air discharge opening; and a rear surface having an outdoor air inlet and an indoor air outlet; a separation wall configured to partition an inner space of the housing into a ventilation portion and an air conditioning portion below the ventilation portion, in which an inner air communication hole and an outdoor air communication hole are respectively formed; a hexahedral total heat exchanger disposed inside the ventilation portion in a front-and-rear direction so that an upper surface and a lower surface thereof are in close contact with a front surface and a rear surface of the housing, respectively; a plurality of partition walls extending from four side edges of the total heat exchanger and configured to partition an inner space of the ventilation space excluding a space for the total heat exchanger into an outdoor air inlet space, an outdoor air discharge space facing the outdoor air inlet space, an indoor air inlet space, and an indoor air discharge space facing the indoor air inlet space; a suction fan module disposed in the outdoor air discharge space and having an outlet connected to the outdoor air communication hole; an exhaust fan module disposed in the indoor air discharge space and having an outlet connected to the indoor air outlet; a bypass duct having a bypass passage in which an inlet communicates with the indoor air inlet space and an outlet communicates with the indoor air discharge space by bypassing the total heat exchange element; a supply-side mullion erected at a position close to the outdoor air communication hole and defining an outdoor air supply passage communicating with the outdoor air communication hole; a discharge-side mullion erected at a position close to the indoor air communication hole and defining an indoor air discharge passage communicating with the indoor air communication hole; an air conditioning passage defined between the supply-side mullion and the discharge-side mullion; an evaporation fan module and an evaporator disposed in the air conditioning passage; a supply damper mounted on the supply-side mullion so that outdoor air passing through the outdoor air communication hole flows to one of the outdoor air supply passage and the air conditioning passage; an exhaust damper mounted on the discharge-side mullion so that indoor air flowing along the indoor air discharge passage flows to one of or both the indoor air communication hole and the air conditioning passage; and a bypass damper mounted at an inlet of the bypass passage so that indoor air passing through the indoor air communication hole flows to one of the indoor air inlet space and the bypass passage, wherein the air discharge opening is formed at a position across the outdoor air supply passage and the air conditioning passage, and Wherein the indoor air passing through the indoor air communication hole flows through one of the total heat exchanger and the bypass passage according to an operation mode.

The operation mode includes a quick ventilation/mixed cooling mode, and when the quick ventilation/mixed cooling mode is executed, the suction fan module, the exhaust fan module, the evaporation fan module, and the evaporator operate, an opening degree of the exhaust damper is adjusted so that the indoor air guided to the indoor air discharge passage flows into the air conditioning passage and the indoor air communication hole, the bypass damper is opened so that the indoor air passing through the indoor air communication hole is guided to the bypass passage and is then discharged to an outside through the indoor air outlet, the supply damper is opened so that the outdoor air introduced into the indoor air inlet sequentially passes through the outdoor air inlet space, the total heat exchange element, the indoor air discharge space, the suction fan module, and the outdoor air communication hole and is guided to the air conditioning passage, and the indoor air and the outdoor air introduced into the air conditioning passage sequentially pass through the evaporation fan module, the evaporator, and the air discharge opening and are supplied to an indoor space.

The operation mode includes a quick cooling mode, and when the quick cooling mode is executed, the suction fan module and the exhaust fan module are stopped, and the opening degree of the exhaust damper is adjusted so that all of the indoor air guided to the indoor air discharge passage sequentially passes through the evaporation fan module, the evaporator, and the air discharge opening and is re-supplied to the indoor space.

The operation mode includes a quick ventilation mode, and when the quick ventilation mode is executed, the evaporation fan module is stopped, the supply damper is closed so that the outdoor air passing through the outdoor air communication hole sequentially passes through the outdoor air supply passage and the air discharge opening and is supplied to the indoor space, and the exhaust damper is closed so that all of the indoor air guided to the indoor air discharge passage passes through the indoor air communication hole and is guided to the bypass passage.

The operation mode includes a quick ventilation/outdoor air cooling simultaneous mode, and when the quick ventilation/outdoor air cooling simultaneous mode is executed, the exhaust damper is closed so that all of the indoor air guided to the indoor air discharge passage passes through the indoor air communication hole and is guided to the bypass passage.

The operation mode includes a quick ventilation/quick cooling mixed mode, and when the quick ventilation/quick cooling mixed mode is executed, the supply damper is closed so that the outdoor air passing through the indoor air communication hole sequentially passes through the indoor air supply passage and the air discharge opening and is supplied to the indoor space.

The operation mode includes a total heat exchange ventilation/mixed cooling mode, and when the total heat exchange ventilation/mixed cooling mode is executed, the bypass damper is closed so that the indoor air passing through the indoor air communication hole sequentially passes through the indoor air inlet space, the total heat exchange element, the exhaust fan module, and the indoor air discharge hole and is discharged to the outside.

The operation mode includes a total heat exchange ventilation/quick cooling mixed mode, and when the total heat exchange ventilation/quick cooling mixed mode is executed, the supply damper is closed so that the outdoor air passing through the outdoor air communication hole sequentially passes through the outdoor air supply passage and the air discharge opening and is supplied to the indoor space.

The operation mode includes a total heat exchange ventilation/outdoor air cooling simultaneous mode, and when the total heat exchange ventilation/outdoor air cooling simultaneous mode is executed, the exhaust damper is closed so that all of the indoor air guided to the indoor air discharge passage passes through the indoor air communication hole.

The operation mode includes a total heat exchange ventilation mode, and when the total heat exchange ventilation mode is executed, the supply damper is closed so that the outdoor air passing through the outdoor air communication hole sequentially passes through the outdoor air supply passage and the air discharge opening and is supplied to the indoor space.

The ventilation apparatus having the above-described configuration according to an embodiment of the present disclosure has the following effects.

First, since the bypass passage is provided inside the ventilation apparatus so that the indoor air is discharged directly to the outside without passing through the total heat exchange element, there is an advantage in that the life of the total heat exchanger is prolonged by minimizing the contamination of the total heat exchange element. Furthermore, there is an advantage in that it is unnecessary to separately install an indoor air filter so that the indoor air is purified before passing through the total heat exchange element.

Second, since it is possible to discharge the indoor air through the bypass passage, the introduced outdoor air can be supplied to the indoor space without recovering waste heat contained in the indoor air. Accordingly, there is an advantage in that ventilation performance and user satisfaction are improved.

Third, since the ventilation means including the total heat exchanger and the filters are provided in the form of a single module, there is an advantage of easy installation and repair.

Fourth, since a hole is formed in the front of a housing for entry and exit of the ventilation module, there is an advantage in that replacement and repair of the ventilation module is very convenient.

Fifth, since a double duct structure is installed at an air discharge opening through which outdoor air is discharged, the outdoor air introduced into the indoor space from the outside and the indoor air supplied back into the indoor space while passing through the air conditioning portion from the indoor space are supplied to the indoor space without mixing with each other. Accordingly, there is an advantage in that air in different states can be supplied to a plurality of indoor spaces.

Sixth, since a bypass passage and a plurality of dampers are provided inside, various types of operation modes can be set, so that a user can select an appropriate operation mode according to needs.

DETAILED DESCRIPTION OF THE EMBODIMENTS

Hereinafter, a ventilation apparatus according to an embodiment of the present disclosure will be described in detail with reference to the accompanying drawings.

Figure 1:
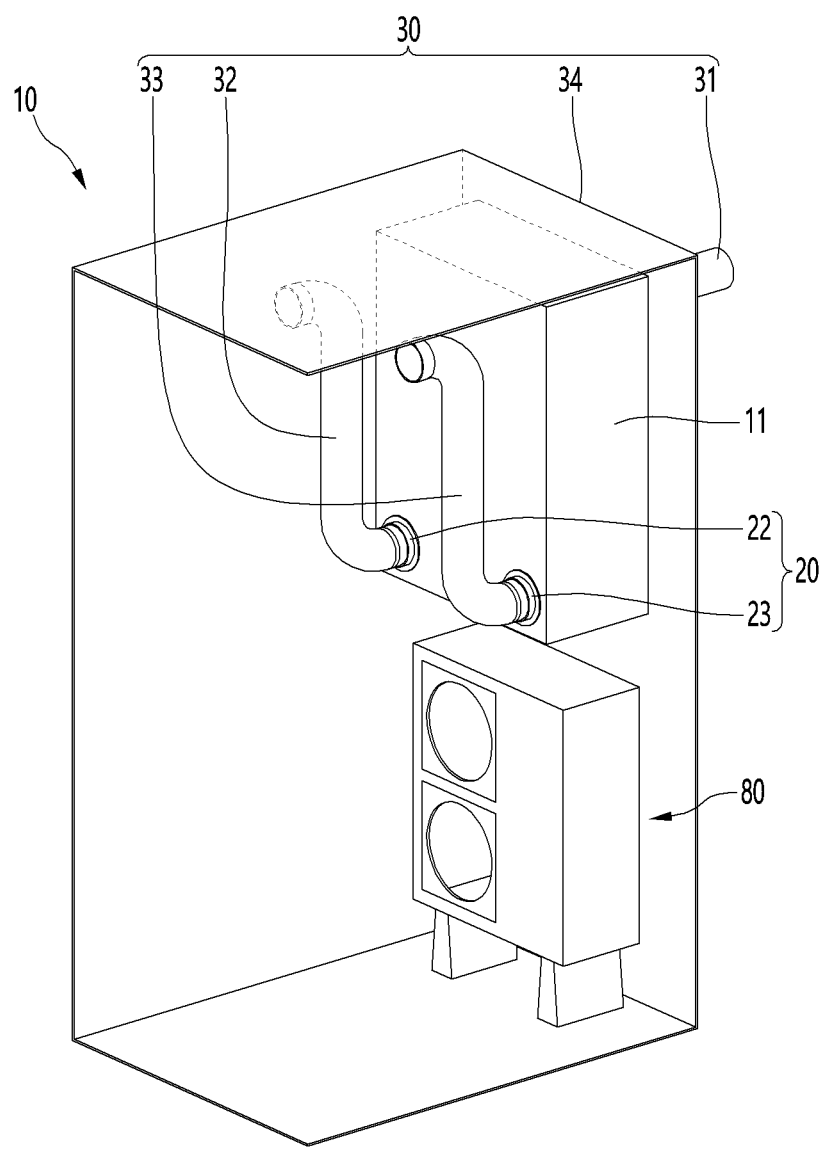
FIG. 1 is a front perspective view of a ventilation apparatus installed indoors according to an embodiment of the present disclosure.
Figure 2:
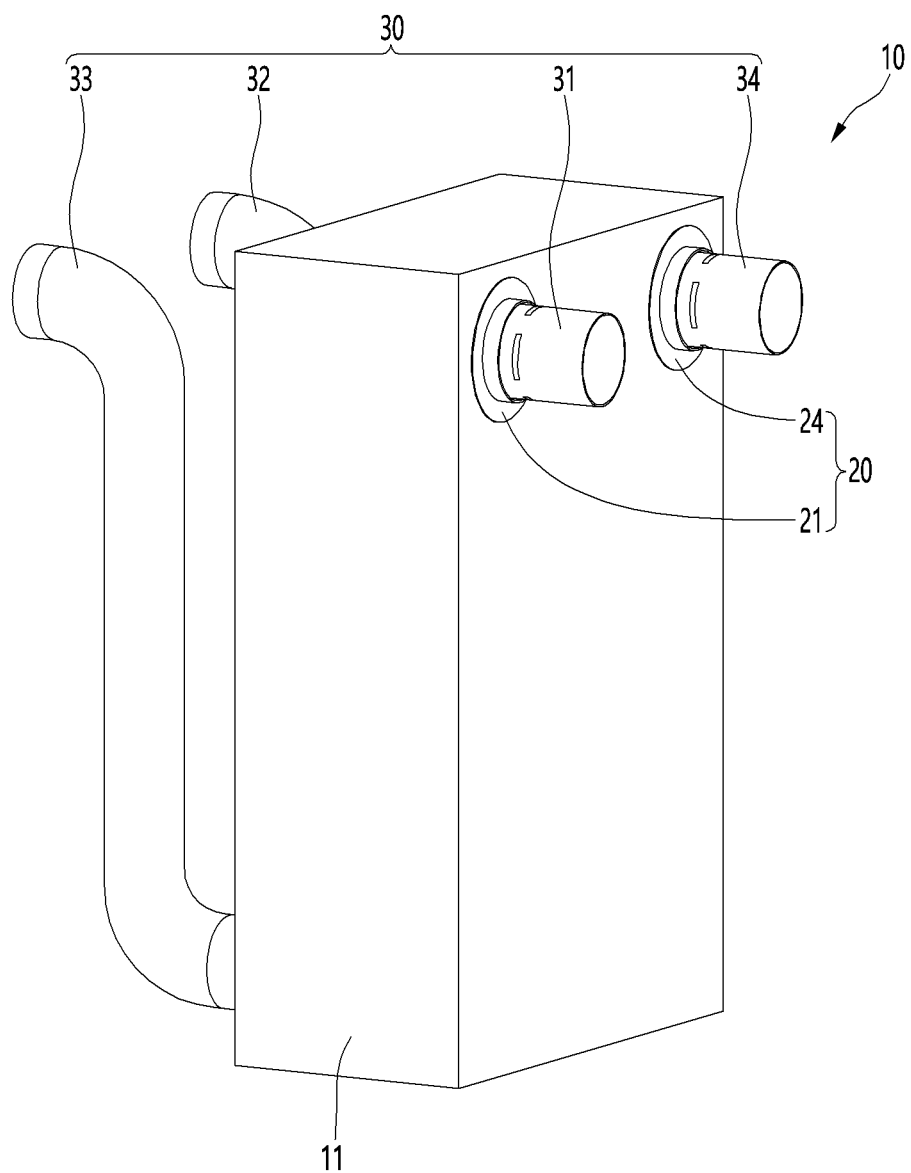
FIG. 2 is a rear perspective view of the ventilation apparatus.
Figure 3:
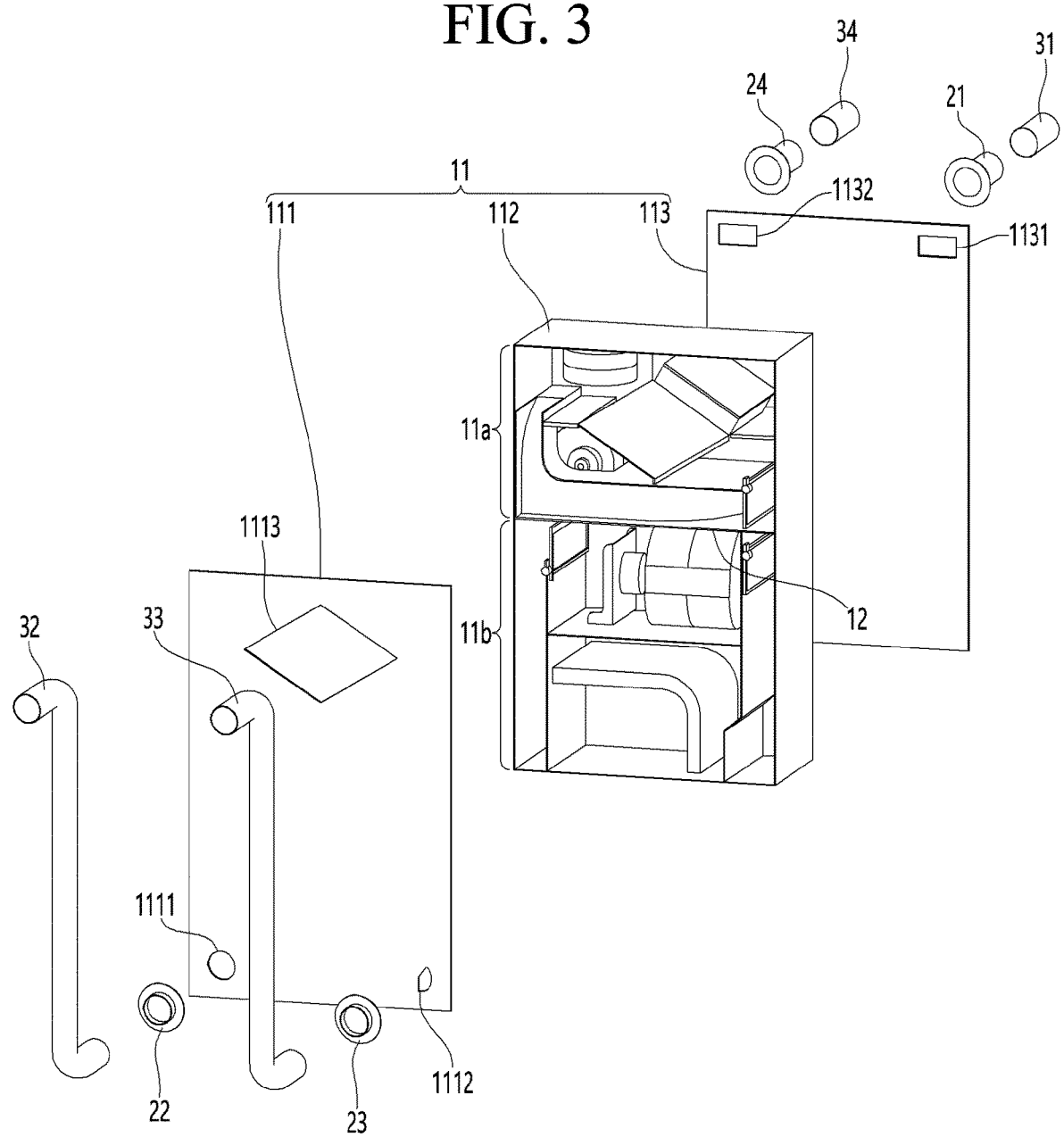
FIG. 3 is an exploded perspective view of the ventilation apparatus.

FIG. 1 is a front perspective view of a ventilation apparatus installed indoors according to an embodiment of the present disclosure, FIG. 2 is a rear perspective view of the ventilation apparatus, and FIG. 3 is an exploded perspective view of the ventilation apparatus.

Referring to FIGS. 1 to 3, the ventilation apparatus 10 according to an embodiment of the present disclosure includes a housing 11 having ventilation components and air conditioning components therein, a duct flange 20 mounted on the front and rear surfaces of the housing 11, and an air duct 30 coupled to the duct flange 20.

In detail, the housing 11 includes a front cover 111, a rear cover 113 positioned at the rear of the front cover 111, and a side cover 112 connecting the edges of the front cover 111 and the rear cover 113. The side cover 112 forms both side surfaces, an upper surface, and a lower surface of the housing 11.

The inner space of the housing 11 is divided into an upper ventilation portion 11a and a lower air conditioning portion 11b by a separation wall 12. Various components necessary for performing a ventilation function are disposed in the ventilation portion 11a, and various components necessary for performing a cooling or heating function are disposed in the air conditioning portion 11b.

Outdoor air introduced into the housing 11 primarily passes through the ventilation portion 11a, is guided to the air conditioning portion 11b, and is then supplied to the indoor space. Indoor air introduced into the housing 11 passes through only the air conditioning portion 11b according to the operation mode and is then discharged back into the indoor space, or passes through the ventilation portion 11a and is then discharged to the outside.

An outdoor air outlet 1111 and an indoor air inlet 1112 are formed in the front cover 111. In a structure in which the air conditioning portion 11b is formed below the ventilation portion 11a, the outdoor air outlet 1111 and the indoor air inlet 1112 may be respectively formed at positions close to the lower end of the front cover 11.

The outdoor air outlet 1111 mainly functions as an outlet through which outdoor air is discharged into the indoor space, but also functions as an outlet through which indoor air is discharged, depending on the operation mode. Therefore, it is noted that the outdoor air outlet 1111 can be broadly defined as an air discharge opening.

An outdoor air inlet 1131 and an indoor air outlet 1132 are formed in the rear cover 113. In a structure in which the ventilation portion 11a is formed above the air conditioning portion 11b, the outdoor air inlet 1131 and the indoor air outlet 1132 may be respectively formed at positions close to the upper end of the rear cover 113.

The outdoor air inlet 1131 and the outdoor air outlet 1111, and the indoor air inlet 1112 and the indoor air outlet 1132 may be formed at positions along a diagonal direction of the housing 11.

On the other hand, the duct flange 20 includes an outdoor air inlet flange 21 coupled to the outdoor air inlet 1131, an outdoor air discharge flange 22 coupled to the outdoor air outlet 1111, an indoor air inlet flange 23 coupled to the indoor air inlet 1112, and an indoor air discharge flange 24 coupled to the indoor air outlet 1132.

In addition, the air duct 30 includes an outdoor air inlet duct 31 coupled to the outdoor air inlet flange 21, an outdoor air discharge duct 32 coupled to the outdoor air discharge flange 22, an indoor air inlet duct 33 coupled to the indoor air inlet flange 23, and an indoor air discharge duct 34 coupled to the indoor air discharge flange 24.

The outdoor air discharge duct 32 and the indoor air inlet duct 33 are manufactured in the same shape, and can be freely coupled to the outdoor air discharge flange 22 and the indoor air inlet flange 23 without being limited to mounting positions.

As shown in FIG. 1, when the ventilation apparatus 10 is attached to the upper side of the wall surface of the veranda or machine indoor space, an outdoor unit 80 provided with components other than air conditioning-related components installed in the air conditioning portion 11b may be disposed below the ventilation apparatus 10. As a result, it is possible to efficiently utilize the space of the veranda or machine indoor space where the ventilation apparatus 10 is installed. In addition, since a length of a pipe constituting a refrigerant cycle for performing the air conditioning function can be minimized, heat loss through the pipe can be minimized.

In addition, since the outlets of the outdoor air discharge duct 32 and the indoor air inlet duct 33 are located at positions close to the ceiling, there is an advantage in that branch ducts branching from the outdoor air discharge duct 32 and the indoor air inlet duct 33 into a plurality of indoor spaces can be installed along the ceiling.

Hereinafter, components provided in the ventilation portion 11a and components provided in the air conditioning portion 11b will be described in detail with reference to the drawings.

Figure 4:
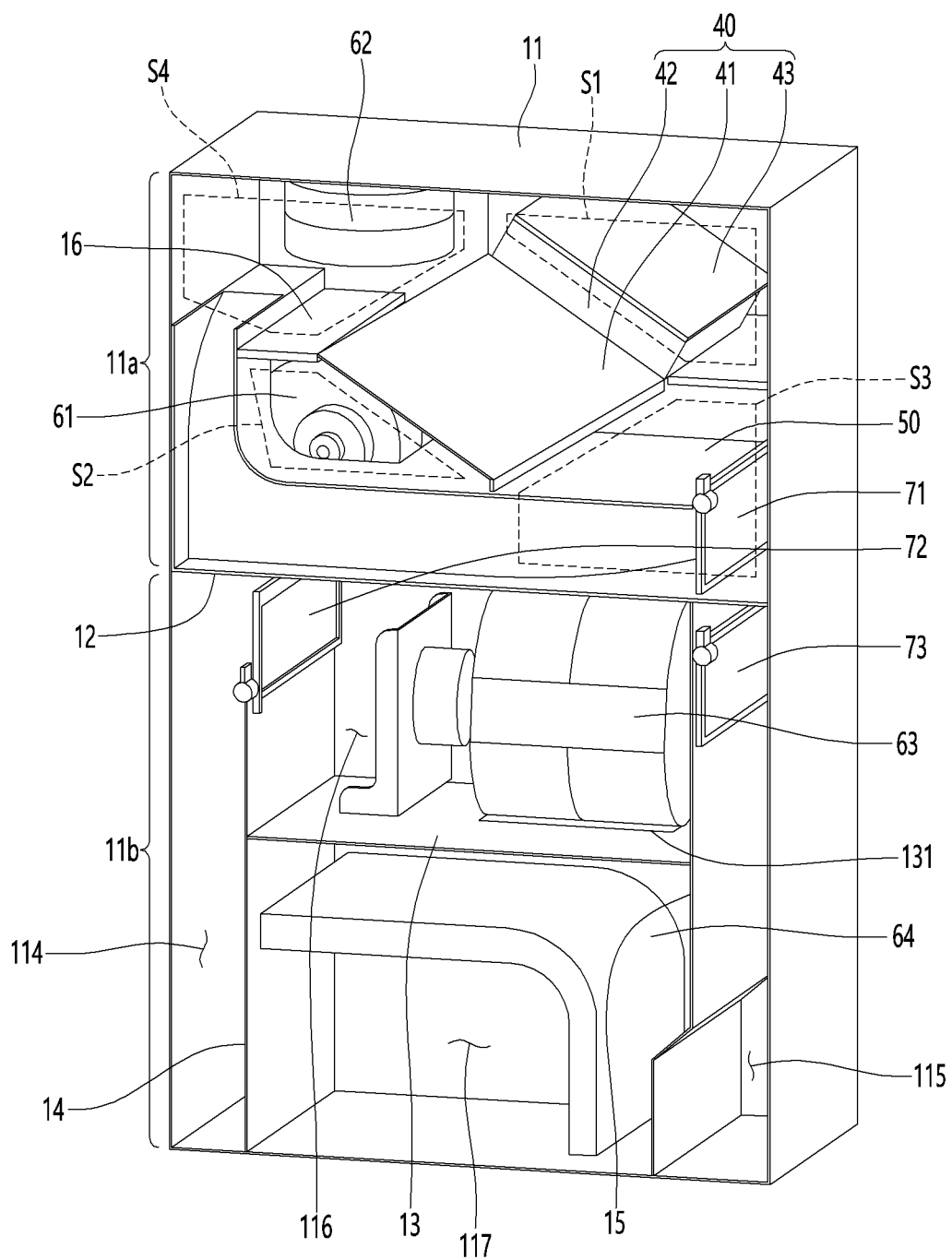
FIG. 4 is a view showing the internal configuration of the ventilation apparatus according to the embodiment of the present disclosure.
Figure 5:
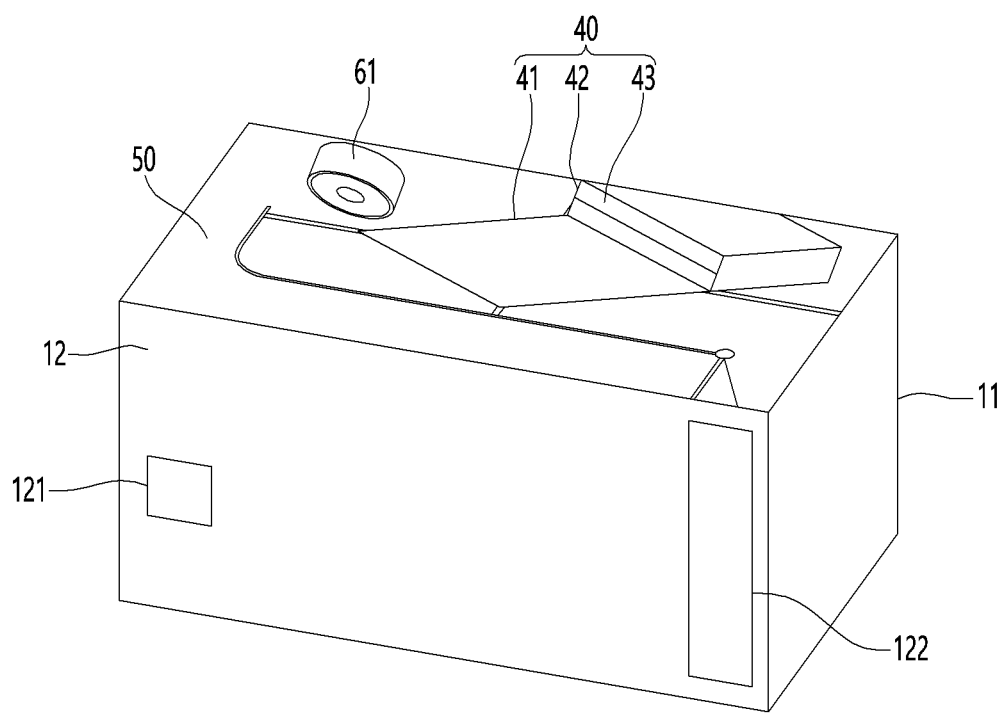
FIG. 5 is a bottom perspective view of the ventilation portion.

FIG. 4 is a view showing the internal configuration of the ventilation apparatus according to the embodiment of the present disclosure, and FIG. 5 is a bottom perspective view of the ventilation portion.

Referring to FIGS. 4 and 5, as described above, the housing 11 of the ventilation apparatus 10 according to the embodiment of the present disclosure is divided into a ventilation portion 11a and an air conditioning portion 11b by a separation wall 12.

A ventilation module 40 is disposed inside the ventilation portion 11a. In detail, the ventilation module 40 includes a total heat exchanger 41 that allows heat exchange between indoor air discharged to the outside and outdoor air introduced into the indoor space without being mixed.

The total heat exchanger 41 has a cross-section with a square or rhombus shape, and has a hexahedral shape in which an indoor air flow channel and an outdoor air flow channel are alternately stacked.

In the present embodiment, two of six surfaces of the total heat exchanger 41 in the form of a rectangle or a rhombus are defined as a front surface and a rear surface, and four surfaces connecting the front surface and the rear surface are defined as side surfaces.

The front surface of the total heat exchanger 41 is in close contact with the rear surface of the front cover 111, and the rear surface of the total heat exchanger 41 is in close contact with the front surface of the rear cover 113. In addition, four corners of the total heat exchanger 41 are installed to face the separation wall 12 and the upper surface and left and right sides of the side cover 112.

In addition, partition walls 16 extend from the four corners of the total heat exchanger 41, respectively. The four partition walls 16 extend toward the separation wall 12 and the upper surface and left and right sides of the side cover 112, respectively. Specifically, two of the four partition walls 16 come into contact with the upper surface and one side surface of the side cover 112. The remaining two partition walls come into contact with the upper surface and the side surface of the bypass duct, which will be described later.

By providing the four partition walls 16, the inner space of the ventilation portion 11a is divided again into four spaces. The four spaces include an outdoor air inlet space S1, an outdoor air discharge space S2, an indoor air inlet space S3, and an indoor air discharge space S4.

The ventilation module 40 includes at least one of a HEPA filter 42 and a pre-filter 43. The HEPA filter 42 and the pre-filter 43 are mounted on one of the four side surfaces of the total heat exchanger 41. Specifically, the HEPA filter 42 and the pre-filter 43 are mounted on the side surface communicating with the outdoor air inlet space S1 among the four side surfaces of the total heat exchanger 41. One surface of the HEPA filter 42 is mounted on the side surface of the total heat exchanger 41, and the pre-filter 43 is mounted on the other surface of the HEPA filter 42.

The total heat exchanger 41, the HEPA filter 42, and the pre-filter 43 are surrounded by one frame and can be mounted in the ventilation portion 11a in the form of a module. The total heat exchanger 41, the HEPA filter 42, and the pre-filter 43 are independently provided to be slidably drawn out from the inside of the frame.

In addition, a mounting hole 1113 for insertion and separation of the ventilation module 40 may be formed in the front cover 111. The mounting hole 113 may be shielded by a separate cover or door (not shown), and the cover or the door may be rotatably coupled to the front cover 111.

On the other hand, the outdoor air inlet 1131 formed in the rear cover 113 is formed in a portion defining the rear surface of the outdoor air inlet space S1, and the indoor air outlet 1132 is formed in a portion defining the rear surface of the indoor air discharge space S4.

Accordingly, the outdoor air introduced into the outdoor air inlet 1131 passes through the ventilation module 40 and is then guided to the outdoor air discharge space S2. The outdoor air introduced into the outdoor air inlet 1131 sequentially passes through the pre-filter 43, the HEPA filter 42, and the total heat exchanger 41.

An outdoor air communication hole 121 and an indoor air communication hole 122 are respectively formed in the separation wall 12, and the outdoor air communication hole 121 and the indoor air communication hole 122 are respectively formed at positions adjacent to both side ends of the separation wall 12.

An exhaust fan module 62 is disposed in the indoor air discharge space S4, and the outlet of the exhaust fan module 62 is connected to the indoor air outlet 1132. A suction fan module 61 is disposed in the outdoor air discharge space S2, and the outlet of the suction fan module 61 is connected to the outdoor air communication hole 121.

In addition, the bypass duct 50 is installed in the ventilation portion 11a, and is connected to the indoor air discharge space S4 across the indoor air inlet space S3 and the outdoor air discharge space S2. That is, the bypass duct 50 extends from the indoor air inlet space S3 to the side end of the outdoor air discharge space S2, extends upward along the side surface of the side cover 112, and communicates with the indoor air discharge space S4. The structure of the bypass duct 50 will be described in more detail with reference to the drawings below.

On the other hand, a part of the components constituting the refrigerant cycle is accommodated in the air conditioning portion 11b. For example, an evaporator 64 and an evaporating fan module 63 may be accommodated, and components of the refrigerant cycle excluding the evaporator 64 and the evaporating fan module 63, that is, a compressor, a condenser, a four-way valve, an expansion valve, and the like may be accommodated in the outdoor unit 80. Through the control of the opening degree of the four-way valve, the evaporator 64 may operate as a condenser to enable a heating operation.

A supply-side mullion 14 is erected on one of both side edges of the air conditioning portion 11a, specifically, on the edge side where the outdoor air communication hole 121 is formed, and a discharge-side mullion 15 is erected on the edge where the indoor air communication hole 122 is formed. Accordingly, the outdoor air communication hole 121 is located at an upper end of an outdoor air supply passage 114 defined between one side surface of the side cover 112 and the supply-side mullion 14. The indoor air communication hole 122 is located at an upper end of an indoor air discharge passage 115 defined between the other side surface of the side cover 112 and the discharge-side mullion 15.

Each of the supply-side mullion 14 and the discharge-side mullion 15 may be defined as a wall, which may be erected vertically, for example, to connect the separation wall 12 and the lower surface of the side cover 112. In particular, as shown, the lower portion of the discharge-side mullion 15 may be bent toward the supply-side mullion 14 and extend downward.

The space formed between the supply-side mullion 14 and the discharge-side mullion 15 may be partitioned into an upper space 116 and a lower space 117 by a separation plate 13 extending horizontally from the supply-side mullion 14 to the discharge-side mullion 15.

An air passage from the upper space 116 to the lower space 117 after passing through the separation plate 13 is a passage through which outdoor air or indoor air cooled by the evaporator 64 flows, and can be defined as an air conditioning passage. Of course, when the refrigerant cycle operates as a heat pump cycle and the evaporator 64 functions as a condenser, the air flowing along the air conditioning passage is heated air. Accordingly, the passage connecting the upper space 116 and the lower space 117 may be defined as an air conditioning passage.

The evaporation fan module 63 may be seated on the upper surface of the separation plate 13, and an evaporator communication hole 131 is formed in the separation plate 13. The outlet of the evaporator fan module 63 is connected to the evaporator communication hole 131.

Figure 8:
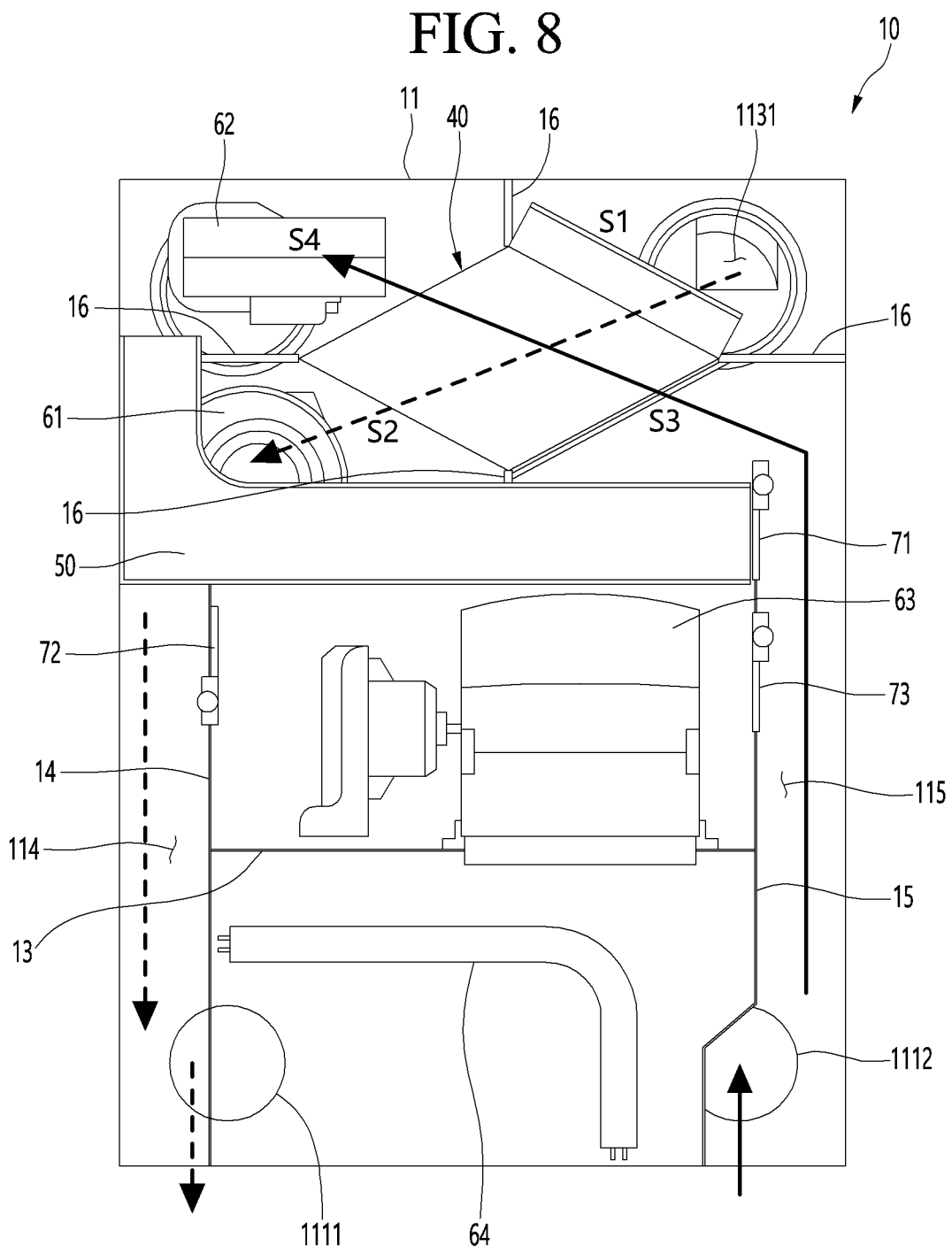
FIG. 8 is a view showing air flow inside the ventilation apparatus in a total heat exchange ventilation mode.

As shown in FIG. 8, the outdoor air outlet 1111 of the front cover 111 is formed to extend across the outdoor air supply passage 114 and the lower space 117. Accordingly, both the air flowing along the outdoor air supply passage 114 and the air sent to the lower space 117 are discharged into the indoor space through the outdoor air outlet 1111.

On the other hand, the indoor air inlet 1112 of the front cover 111 is designed to communicate only with the indoor air discharge passage 115. Accordingly, the indoor air introduced through the indoor air inlet 1112 does not flow into the lower space 117 and rises only along the indoor air discharge passage 115.

A bypass damper 71 is mounted at the inlet of the bypass duct 50, a supply damper 72 is mounted on the supply-side mullion 14, and an exhaust damper 73 is mounted on the exhaust-side mullion 15.

The bypass damper 71 selectively opens or closes the inlet of the bypass duct 50. Specifically, when the bypass damper 71 closes the inlet of the bypass duct 50, the indoor air discharge passage 115 and the indoor air inlet space S3 communicate with each other through the indoor air communication hole 122. Conversely, when the bypass damper 71 opens the inlet of the bypass duct 50, the indoor air discharge passage 115 and the bypass passage (to be described later) formed in the bypass duct 50 communicate with each other through the indoor air communication hole 122.

In addition, when the supply damper 72 is opened, the outdoor air supply passage 114 and the upper space 116 communicate with each other, and when the exhaust damper 73 is opened, the upper space 116 and the indoor air discharge passage 115 communicate with each other.

Figure 6:
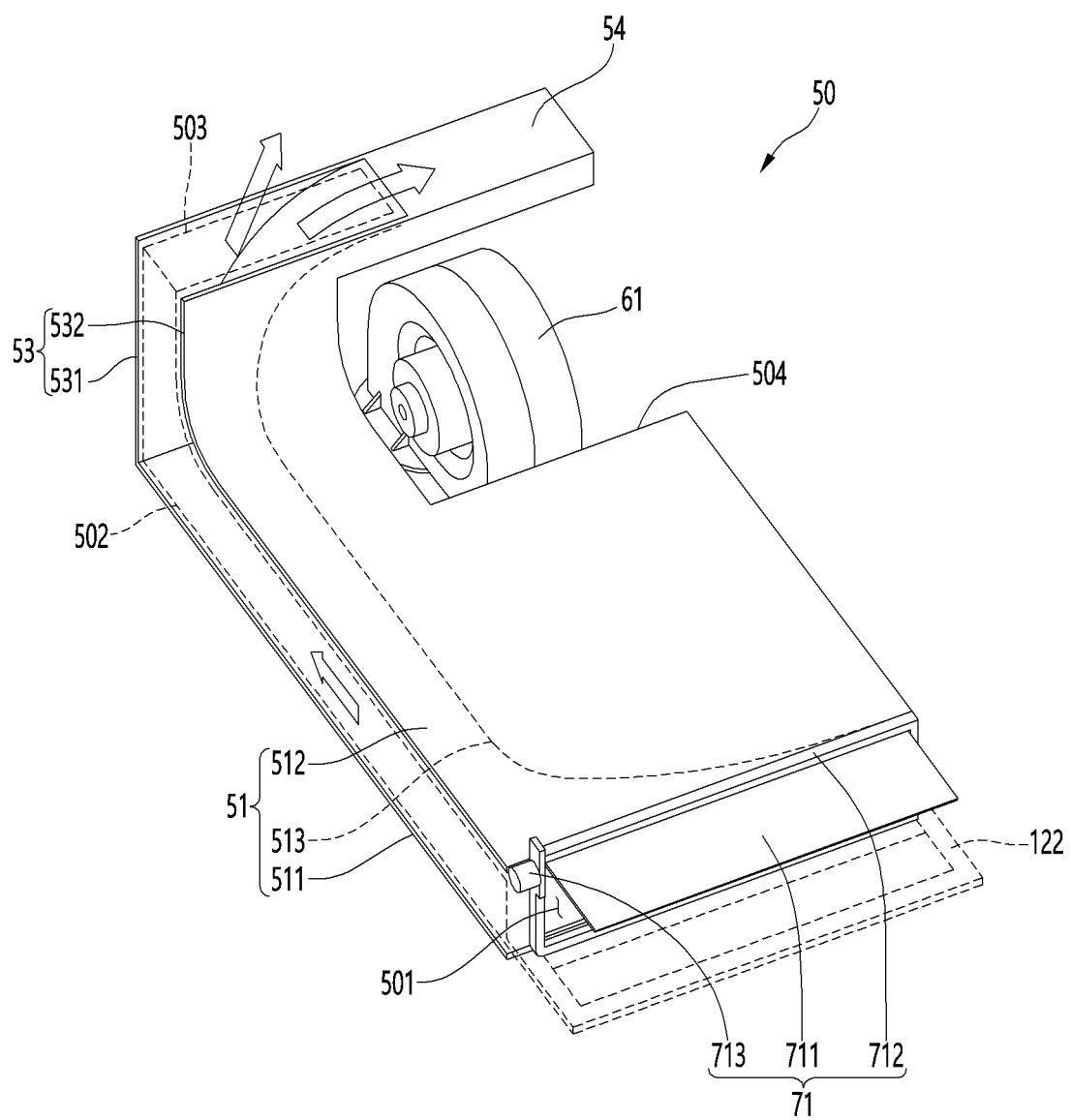
FIG. 6 is a top perspective view of a bypass duct constituting the ventilation apparatus according to the embodiment of the present disclosure.
Figure 7:
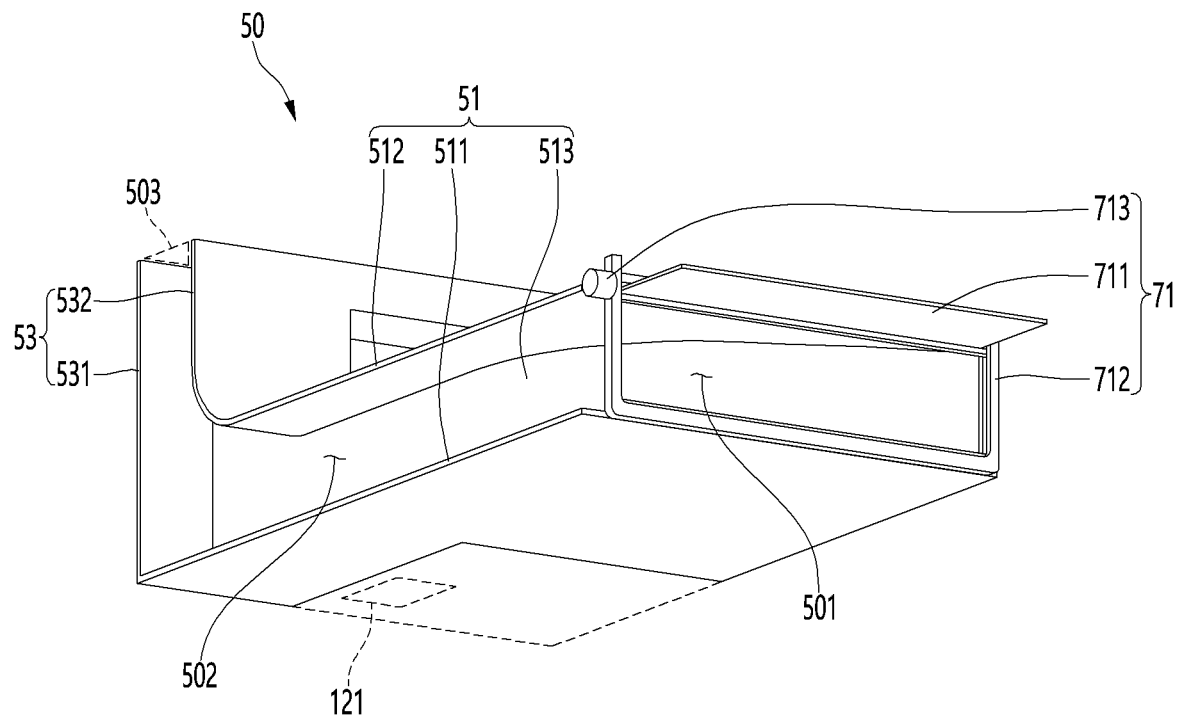
FIG. 7 is a bottom perspective view of the bypass duct.

FIG. 6 is a top perspective view of the bypass duct constituting the ventilation apparatus according to the embodiment of the present disclosure, and FIG. 7 is a bottom perspective view of the bypass duct.

Referring to FIGS. 6 and 7, the ventilation apparatus 10 according to the embodiment of the present disclosure is provided with the bypass duct 50, and the bypass duct 50 extends along the bottom and side portions of the ventilation portion 11a.

In detail, the bypass duct 50 includes a transverse portion 51 seated on the separation wall 12, a side portion 53 that is bent from the side end of the transverse portion 51 and extends upward, and an upper portion 54 extending rearward from the upper end of the side portion 53.

The front surface of the bypass duct 50 may be opened, and the front end portion of the bypass duct 50 may be in close contact with the rear surface of the front cover 111. Alternatively, the front side of the bypass duct 50 may be closed by a front plate, and the front plate may be in close contact with the rear surface of the front cover 111. The rear surface of the bypass duct 50 is in close contact with the front surface of the rear cover 113.

The side surface of the transverse portion 51 is opened to define a bypass inlet 501, and the side surface of the transverse portion 51 where the bypass inlet 501 is defined is spaced apart from the side cover 112 of the housing 11 by a predetermined distance.

The bypass damper 71 is mounted on the bypass inlet 501, and the bypass damper 71 includes a damper frame 712 mounted on the side edge of the transverse portion 51, a damper 711 rotatably connected to the upper end of the damper frame 712, and a damper motor 713 that rotates the damper 711. Like the bypass damper 71, each of the supply damper 72 and the exhaust damper 73 also includes a damper frame, a damper, and a damper motor.

The damper 711 has a width corresponding to the height of the transverse portion 51 and a length corresponding to the front-and-rear direction width of the transverse portion 51. The side surface of the transverse portion 51 and the side cover 112 are spaced apart from each other by a distance corresponding to the width of the damper 711. The space formed between the side surface of the transverse portion 51 and the side cover 112 is a passage through which the indoor air sucked through the indoor air inlet 1112 is guided to the indoor air inlet space S3, and can be defined as an indoor air discharge passage. When the damper 711 is in a vertical state, the bypass inlet 501 is closed, and when the damper 711 rotates to a horizontal state and the bypass inlet 501 is opened, the indoor air discharge passage is closed.

A suction fan module accommodation groove 504 for accommodating the suction fan module 61 is formed in a portion of the bypass duct 50, and the suction fan module accommodation groove 504 is formed by cutting a portion of the transverse portion 51 and a portion of the side portion 53 of the bypass duct 50. The cut surfaces of the transverse portion 51 and the side portion 53 defining the edge of the suction fan module accommodation groove 504 are closed.

On the other hand, the transverse portion 51 includes a bottom portion 511 seated on the separation wall 12, an upper portion 512 spaced apart from the bottom portion 511 by a predetermined height, and a passage guide 513 connecting the bottom portion 511 and the upper portion 512.

One side end of the bottom portion 511 defines the lower edge of the bypass inlet 501 and is spaced apart from the side cover 112 by a length corresponding to the width of the damper 711. The indoor air communication hole 122 is formed in a portion of the separation wall 12 that closes the space between one side end of the bottom portion 511 and the side cover 112.

As another method, the bottom portion 511 may be formed in the same size as the separation wall 12, and as indicated by a dotted line, the indoor air communication hole 122 and the outdoor air communication hole 121 may be formed in the bottom portion 511. In this case, the bottom portion 511 may replace the function of the separation wall 12.

The passage guide 513 is formed at a position spaced a predetermined distance backward from the front end of the transverse portion 51, so that a bypass passage 502 is formed between the front surface of the bypass duct 50 and the passage guide 513.

In detail, the passage guide 513 extends forward from the rear end of the bypass inlet 501, and then extends toward the side portion 53 and the upper portion 54. When the passage guide 513 extends from the rear end to the front end of the bypass duct 50, the passage guide 513 may extend to be inclined in a direction away from the side cover 112 or to be rounded with a predetermined curvature. In particular, the passage guide 513 may be formed to be rounded with a predetermined curvature at a corner portion where the side surface and the front surface of the bypass duct 50 meet each other.

In addition, the passage guide 513 may extend to the other end of the transverse portion 51, that is, the side portion 53, and may then extend to be gently rounded upward with a predetermined curvature.

On the other hand, the side portion 53 includes an outer bent portion 531 and an inner bent portion 532. In detail, the outer bent portion 531 is a portion bent upward from the other end of the bottom portion 511, that is, the opposite side end of the bypass inlet 501, and is in close contact with the inner surface of the side cover 112.

In addition, the inner bent portion 532 is bent upward from the other end of the upper portion 512 and extends upward. The portion where the inner bent portion 532 and the upper portion 512 meet each other may be curved with a predetermined curvature.

In addition, the front end of the upper portion 54 is in close contact with the front cover 111, the rear end of the upper portion 4 is in close contact with the rear cover 113, and a bypass outlet 503 is formed in a portion of the upper portion 54. The passage guide 513 extends upward from the side portion 53, is rounded to the rear, and is connected to the rear end of the bypass outlet 503. Accordingly, the bypass outlet 503 may be understood as a discharge port of the bypass passage 502.

In summary, the passage guide 513 includes a first guide extending from the rear end of the bypass inlet 501 toward the front end of the bypass duct 50, a second guide bent from the front end of the first guide and extending to the side portion 53, and a third guide extending roundly from the end of the second guide toward the upper rear side.

In addition, the bypass passage 502 may be described as including a suction area defined by the bypass inlet 501 and the first guide, a transfer area extending from the suction area to the side portion 53, and a discharge area extending from the end of the transfer area to the bypass outlet 503.

As shown in FIG. 4, among the four partition walls 16 extending from the side edges of the total heat exchanger 41, the partition wall partitioning the indoor air discharge space S4 and the outdoor air discharge space S2 is connected to the side portion 53 of the bypass duct 50. Accordingly, the bypass outlet 503 communicates with the indoor air discharge space S4. The indoor air flowing along the bypass passage 502 is discharged only to the indoor air discharge space S4 through the bypass outlet 503, and is completely discharged to the outside of the ventilation apparatus 10 by the exhaust fan module 62.

The bypass outlet 503 may be formed to have a length from the front end to the rear end of the upper portion 54, and as shown, may be formed to have a length of about half of the upper portion 54.

Hereinafter, the flow of indoor air and outdoor air made for each operation mode in the ventilation apparatus according to the embodiment of the present disclosure will be described with reference to the drawings.

FIG. 8 is a view showing air flow w inside the ventilation apparatus in a total heat exchange ventilation mode.

Referring to FIG. 8, when the total heat exchange ventilation mode is executed, both the suction fan module 61 and the exhaust fan module 62 operate, and the bypass damper 71 opens the indoor air discharge passage and blocks the bypass inlet 501 of the bypass duct 50. The supply damper 72 and the exhaust damper 73 are closed. The expression that the supply damper 72 and the exhaust damper 73 are closed means that the outdoor air supply passage 114 and the indoor air discharge passage 115 do not communicate with the upper space 116 where the evaporation fan module 63 is accommodated.

In this state, when the suction fan module 61 is driven, outdoor air is introduced into the outdoor air inlet space S1 through the outdoor air inlet duct 31. The outdoor air introduced into the outdoor air inlet space S1 passes through the ventilation module 40 and is then guided to the outdoor air discharge space S2.

The outdoor air guided to the outdoor air discharge space S2 is sucked by the suction fan module 61, and is then guided to the outdoor air supply passage 114 through the outdoor air communication hole 121. The outdoor air guided to the outdoor air supply passage 114 is supplied to the indoor space through the outdoor air outlet 1111 and the outdoor air outlet duct 32.

When the exhaust fan module 62 is driven, the indoor air is guided to the indoor air discharge passage 115 through the indoor air inlet duct 33, and is guided to the indoor air inlet space S3 through the indoor air communication hole 122 and the indoor air discharge passage.

The indoor air guided to the indoor air inlet space S3 passes through the total heat exchanger 41 and is then guided to the indoor air discharge space S4. The outdoor air and the indoor air exchange heat while passing through the total heat exchanger 41 (waste heat recovery).

The indoor air guided to the indoor air discharge space S4 is sucked by the exhaust fan module 62 and then discharged to the outside through the indoor air discharge duct 34.

In winter, by the waste heat recovery process occurring in the ventilation module 40, the outdoor air absorbs heat from the indoor air discharged to the outside and is then supplied to the indoor space, thereby preventing a sudden drop in the indoor temperature.

On the other hand, in summer, heat is emitted from the outdoor air to the indoor air discharged to the outside and supplied to the indoor space in a low temperature state, thereby preventing a sudden increase in the indoor temperature.

Figure 9:
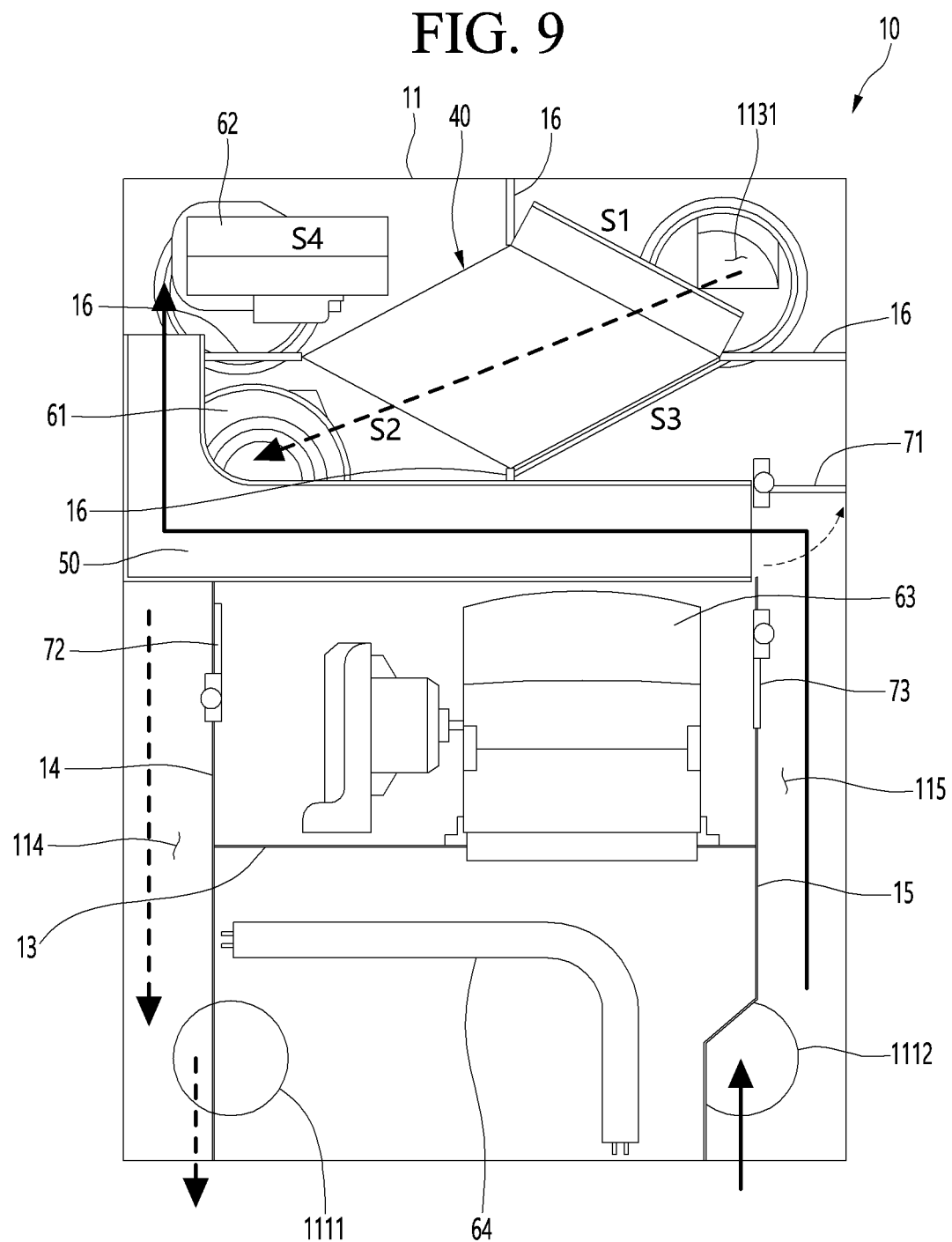
FIG. 9 is a view showing air flow inside the ventilation apparatus in a quick ventilation mode.

FIG. 9 is a view showing air flow inside the ventilation apparatus in a quick ventilation mode.

Referring to FIG. 9, when the quick ventilation mode (or outdoor air cooling mode) is executed, the suction fan module 61 and the exhaust fan module 62 operate, and the evaporation fan module 63 does not operate.

In detail, the bypass damper 71 operates to close the indoor air discharge passage, while the bypass inlet 501 of the bypass duct 50 is opened. In addition, the supply damper 72 and the exhaust damper 73 are also maintained in a closed state.

When the suction fan module 61 operates in this state, as in the total heat exchange ventilation mode, the outdoor air sequentially passes through the outdoor air inlet duct 31, the outdoor air inlet space S1, the ventilation module 40, the outdoor air discharge space S2, the outdoor air supply passage 114, and the outdoor air discharge duct 32, and is then supplied to the indoor space.

When the exhaust fan module 62 operates, the indoor air passes through the indoor air inlet duct 33, the indoor air discharge passage 115, and the indoor air communication hole 122, sequentially passes through the bypass inlet 501 of the bypass duct 50, the bypass passage 502, the bypass outlet 503, the indoor air discharge space S4, and the indoor air discharge duct 34, and is discharged to the outside.

In this case, since the indoor air does not pass through the total heat exchanger 41, the outdoor air introduced into the indoor space is discharged into the indoor space at an outdoor temperature. Accordingly, when the quick ventilation mode is executed in autumn or winter, fresh outdoor air having a low temperature is supplied to the indoor space.

In addition, since the indoor air does not pass through the total heat exchanger 41, oil, smoke, and other harmful substances scattered in the air during a cooking process are directly discharged to the outside during cooking in a kitchen, thereby minimizing contamination of the total heat exchanger 41.

When the total heat exchange ventilation mode is executed during cooking in the kitchen, the inner circumferential surface of the total heat exchanger 41 is contaminated while the contaminated indoor air passes through the total heat exchanger 41. As a result, the life of the total heat exchanger 41 may be shortened.

Accordingly, when the indoor air is heavily contaminated, the quick ventilation mode using the bypass duct 50 is executed to allow the indoor air to be quickly discharged to the outside and to minimize contamination of the total heat exchange element.

Figure 10:
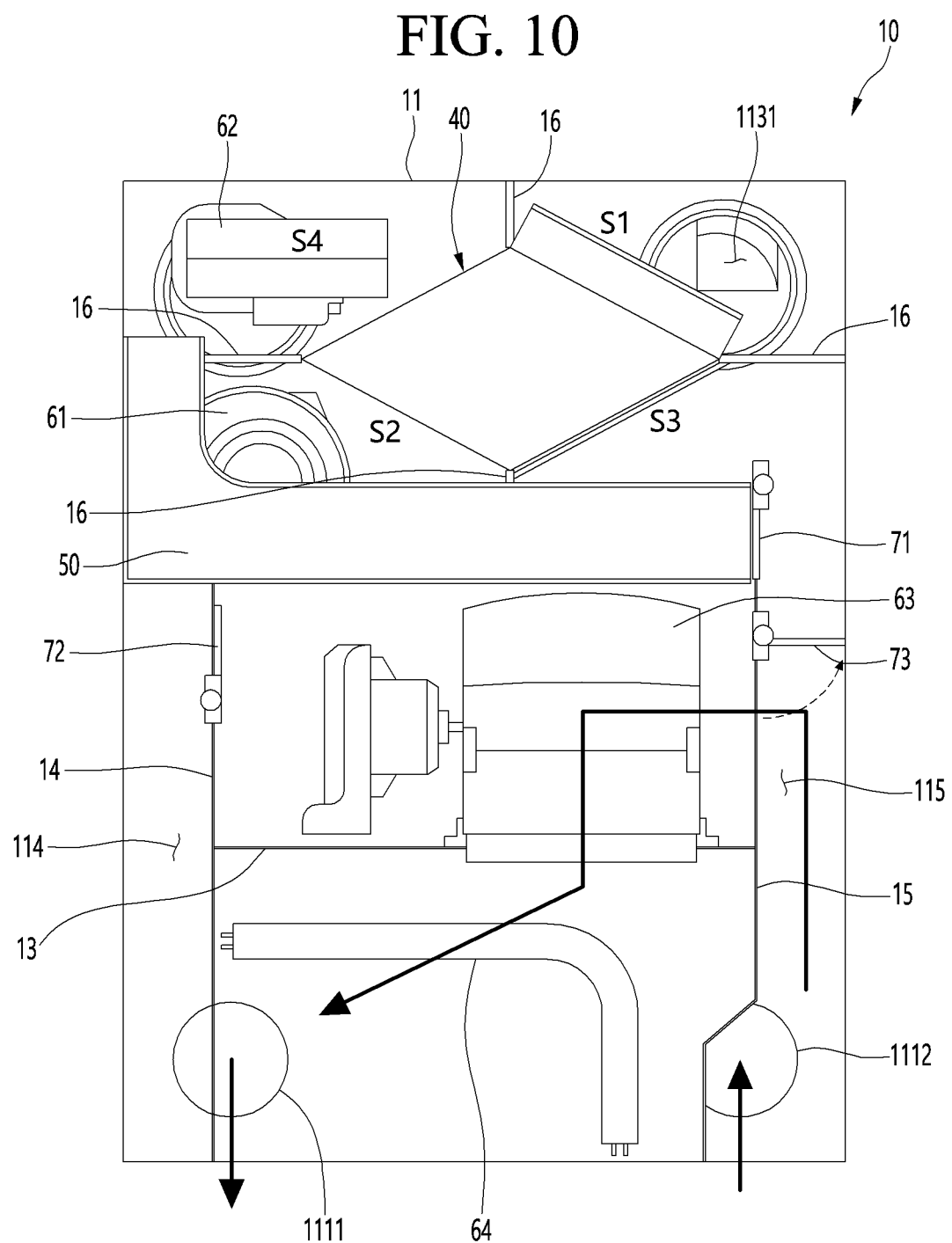
FIG. 10 is a view showing air flow inside the ventilation apparatus in a quick cooling mode.

FIG. 10 is a view showing air flow inside the ventilation apparatus in a quick cooling mode.

Referring to FIG. 10, when the quick cooling mode is executed, the suction fan module 61 and the exhaust fan module 62 are stopped and the refrigerant cycle operates so that the evaporator 64 and the evaporation fan module 63 operate. When the refrigerant cycle operates, a low-temperature, low-pressure two-phase refrigerant flows to the evaporator 64.

In addition, the exhaust damper 73 operates to shield the indoor air discharge passage 115 and allow the indoor air discharge passage 115 and the upper space 116 to communicate with each other.

In this state, when the evaporation fan module 63 operates, indoor air is introduced into the indoor air inlet duct 33 and is then guided to the indoor air outlet passage 115. The indoor air guided to the indoor air discharge passage 115 is guided to the upper space 116 and is guided to the lower space 117 through the evaporator fan module 63 and the evaporator communication hole 131.

The temperature of the indoor air guided to the lower space 117 drops while passing through the evaporator 64, and the indoor air is supplied back into the indoor space through the outdoor air outlet 1111.

Figure 11:
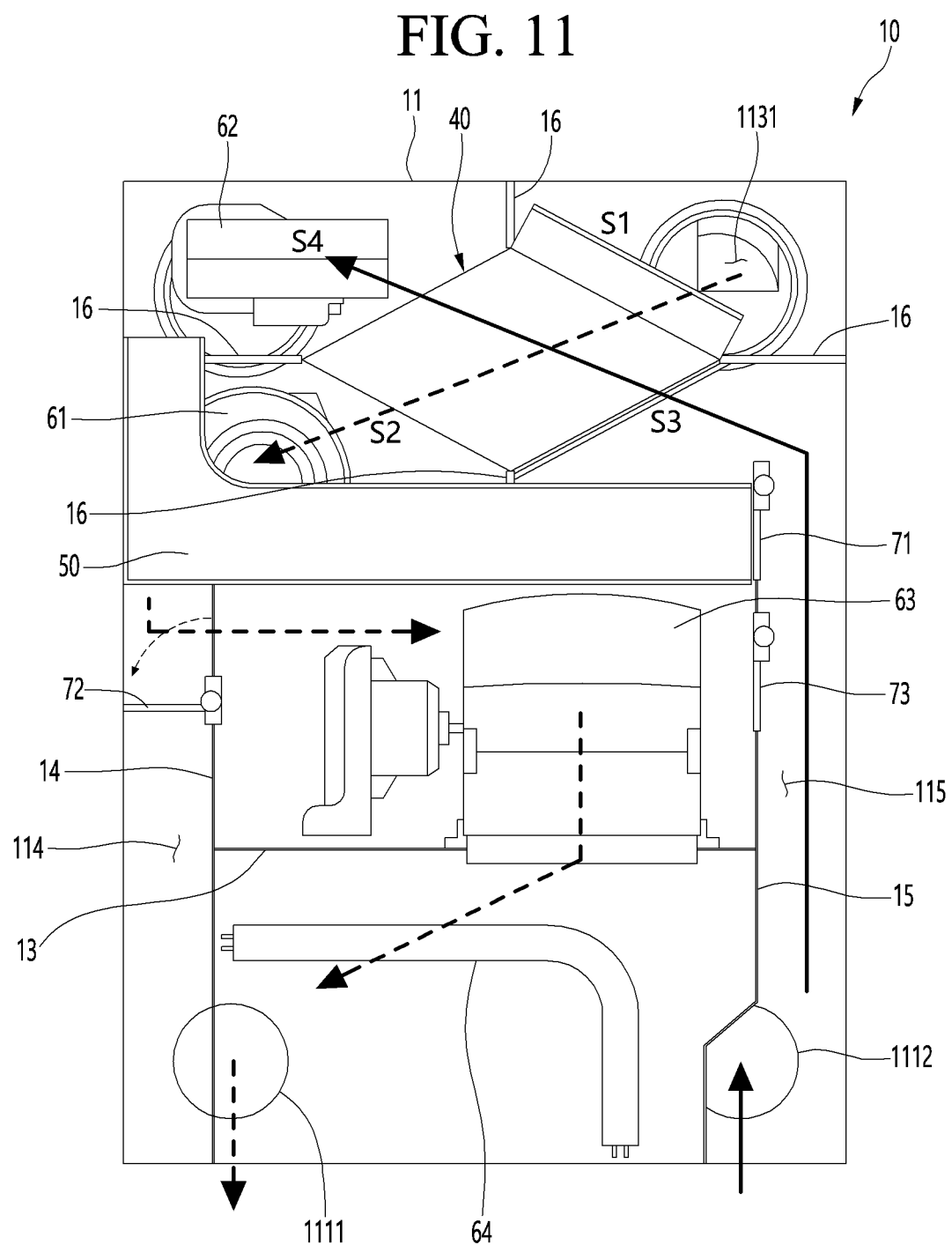
FIG. 11 is a view showing air flow inside the ventilation apparatus in a total heat exchange ventilation/outdoor air cooling simultaneous mode.

FIG. 11 is a view showing air flow inside the ventilation apparatus in a total heat exchange ventilation/outdoor air cooling simultaneous mode.

Referring to FIG. 11, when the total heat exchange ventilation/outdoor air cooling simultaneous mode is executed, the total heat exchange ventilation mode and the outdoor air cooling mode are simultaneously performed.

The outdoor air cooling mode refers to an operation mode in which outdoor air introduced into the ventilation apparatus 10 is cooled while passing through the evaporator 64 and is then supplied to the indoor space.

In detail, the total heat exchange ventilation/outdoor air cooling simultaneous mode is the same as the total heat exchange ventilation mode described with reference to FIG. 8, except that the supply damper 72 is switched to close the outdoor air supply passage 114. Accordingly, the outdoor air sucked by the suction fan module 61 does not flow along the outdoor air supply passage 114 after passing through the ventilation module 40, but is guided to the upper space 116 in which the evaporation fan module 63 is accommodated. The outdoor air guided to the upper space 116 passes through the evaporator fan module 63 and the evaporator communication hole 131 and is guided to the lower space 117. The outdoor air guided to the lower space 117 is cooled while passing through the evaporator 64 and is then supplied to the indoor space through the outdoor air discharge duct 32.

The total heat exchange ventilation/outdoor air cooling simultaneous mode may be used when a large amount of fresh outdoor air is required and waste heat recovery is required in a situation where the temperature difference between indoors and outside is relatively large.

For example, in a case where the indoor air quality is poor in summer and thus fresh outdoor air is needed, but the window cannot be opened due to the high outside temperature, when the total heat exchange ventilation/outdoor air cooling simultaneous mode is executed, the introduced outdoor air exchanges heat with indoor air having a relatively low temperature while passing through the total heat exchanger 41, and thus, the temperature of the outdoor air drops. In addition, the outdoor air whose temperature has dropped to a certain level is cooled to a temperature similar to that of the indoor space while passing through the evaporator 64 and is then supplied to the indoor space. Therefore, since the outdoor air with a large amount of oxygen is primarily cooled to a temperature lower than the outdoor temperature while passing through the total heat exchanger 41, there is an advantage in that an excessive load is not applied to the evaporator 64. Accordingly, there is an advantage in that an evaporator having a small capacity can be used.

In addition, when the refrigerant cycle is operated by a heat pump in winter so that the evaporator 64 acts as a condenser, the introduced outdoor air absorbs heat from the indoor air while passing through the total heat exchanger 41 and then passes through the condenser. Accordingly, the condenser is not overloaded.

Figure 12:
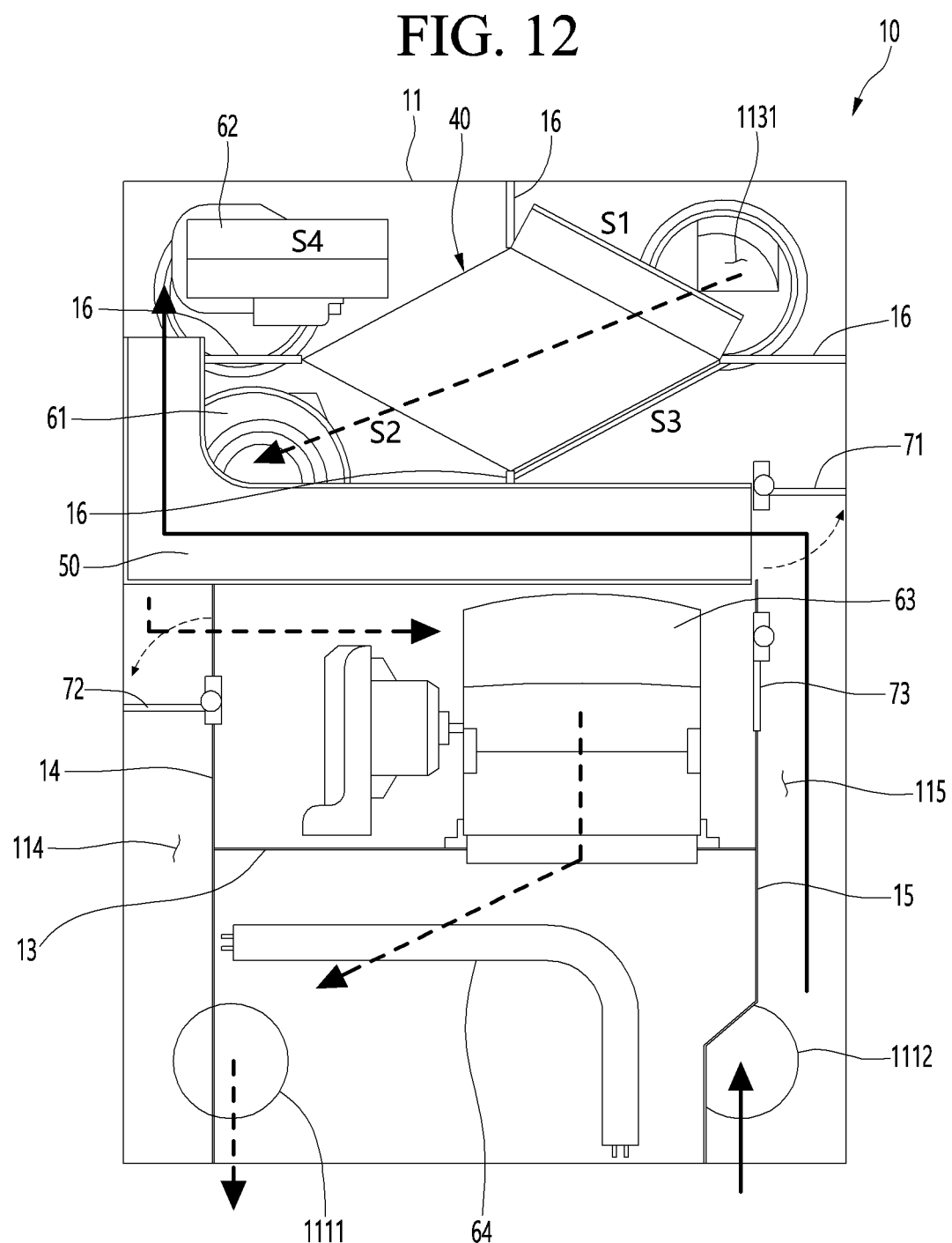
FIG. 12 is a view showing air flow inside the ventilation apparatus in a quick ventilation/outdoor air cooling simultaneous mode.

FIG. 12 is a view showing air flow inside the ventilation apparatus in a quick ventilation/outdoor air cooling simultaneous mode.

Referring to FIG. 12, the quick ventilation/outdoor air cooling simultaneous mode is the same as the quick ventilation mode described with reference to FIG. 9, except that the supply damper 72 is switched to close the outdoor air supply passage 114. Accordingly, the outdoor air sucked by the suction fan module 61 does not flow along the outdoor air supply passage 114 after passing through the ventilation module 40, but is guided to the upper space 116 in which the evaporation fan module 63 is accommodated. The outdoor air guided to the upper space 116 passes through the evaporator fan module 63 and the evaporator communication hole 131 and is guided to the lower space 117. The outdoor air guided to the lower space 117 is cooled while passing through the evaporator 64 and is then supplied to the indoor space through the outdoor air discharge duct 32.

The quick ventilation/outdoor air cooling simultaneous mode is an operation mode that can be usefully used when it is necessary to quickly discharge the indoor air to the outside because the indoor air is highly contaminated due to cooking and to introduce a large amount of fresh outdoor air, and when waste heat recovery is not required. In particular, the quick ventilation/outdoor air cooling simultaneous mode can be said to be an operation mode that can be usefully used in late summer or early autumn when indoor air quality is low.

Figure 13:
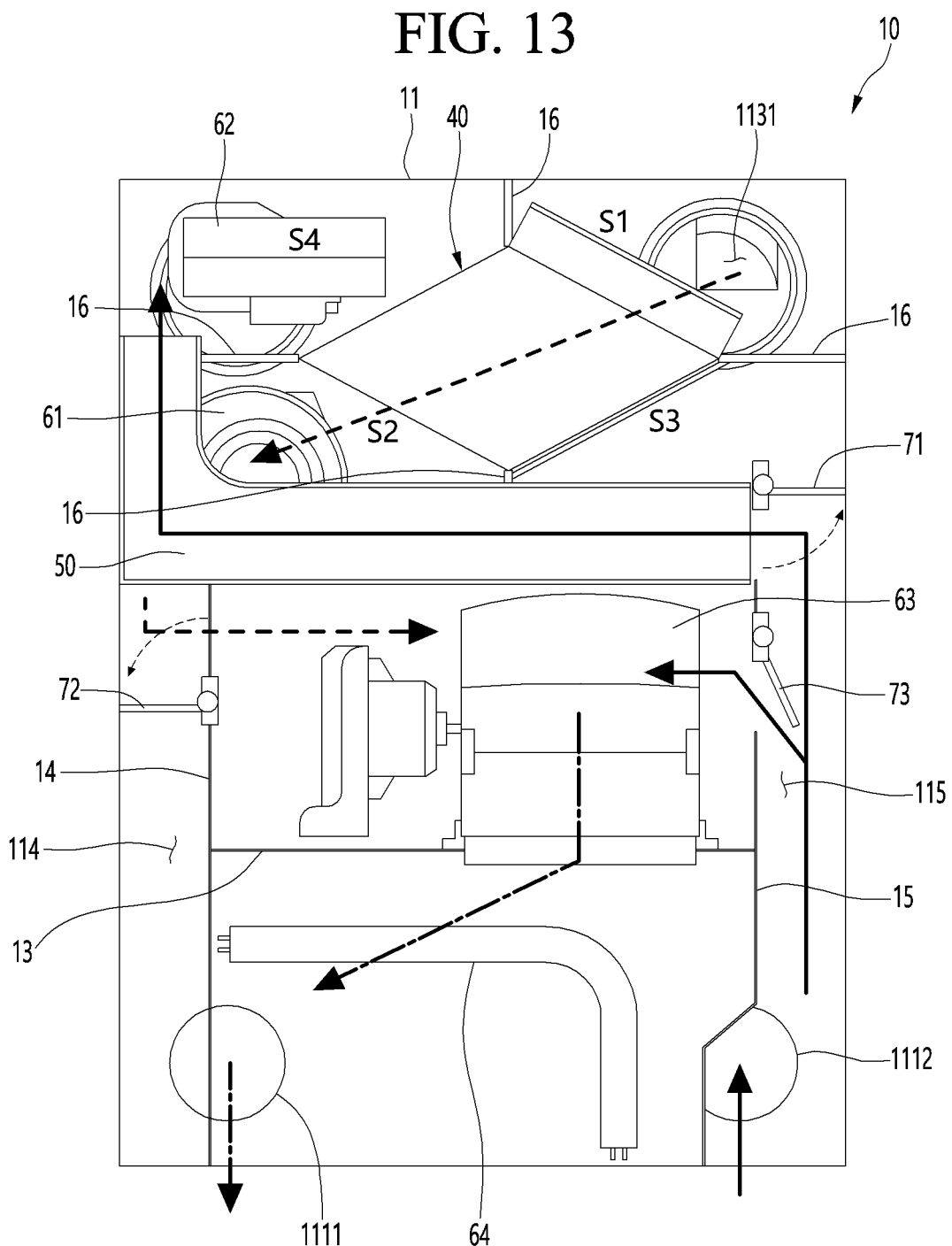
FIG. 13 is a view showing air flow inside the ventilation apparatus in a quick ventilation/mixed cooling mode.

FIG. 13 is a view showing air flow inside the ventilation apparatus in a quick ventilation/mixed cooling mode.

Referring to FIG. 13, the quick ventilation/outdoor air cooling simultaneous mode is the same as the quick ventilation/outdoor air cooling simultaneous mode described with reference to FIG. 12, except that the exhaust damper 73 is switched at an angle less than 90 degrees so that the indoor air introduced through the indoor air inlet duct 33 flows into the total heat exchanger 41 and the upper space 116.

In detail, when the quick ventilation/outdoor air cooling simultaneous mode is executed, the outdoor air sucked by the suction fan module 61 flows along the indoor air discharge passage 115 and then flows into the bypass passage 502 and the upper space 116. The indoor air flowing into the upper space 116 is guided to the lower space 117 by the evaporation fan module 63. The indoor air guided to the lower space 117 is cooled while passing through the evaporator 64 and is then supplied to the indoor space through the outdoor air discharge duct 32.

The quick ventilation/outdoor air cooling simultaneous mode can be said to be an operation mode that is useful in summer when the indoor air quality rapidly deteriorates while cooking and the indoor temperature rapidly rises due to the use of cooking equipment.

That is, a part of the indoor air, which has deteriorated rapidly during the cooking process, does not pass through the total heat exchanger 41 and is quickly discharged to the outside, thereby minimizing contamination of the total heat exchanger 41. In addition, since fresh outdoor air and a part of the indoor air sucked into the indoor air discharge passage 115 are supplied to the indoor space in a low temperature state, the indoor temperature decreases. Accordingly, it is possible to obtain an effect of improving indoor air quality.

Since a part of the indoor air flowing along the indoor air discharge passage 115 passes through the evaporator 64 and is supplied back into the indoor space, indoor air quality does not improve rapidly all at once, but this operation mode is maintained for a predetermined time, thereby obtaining an effect of improving indoor air quality.

Figure 14:
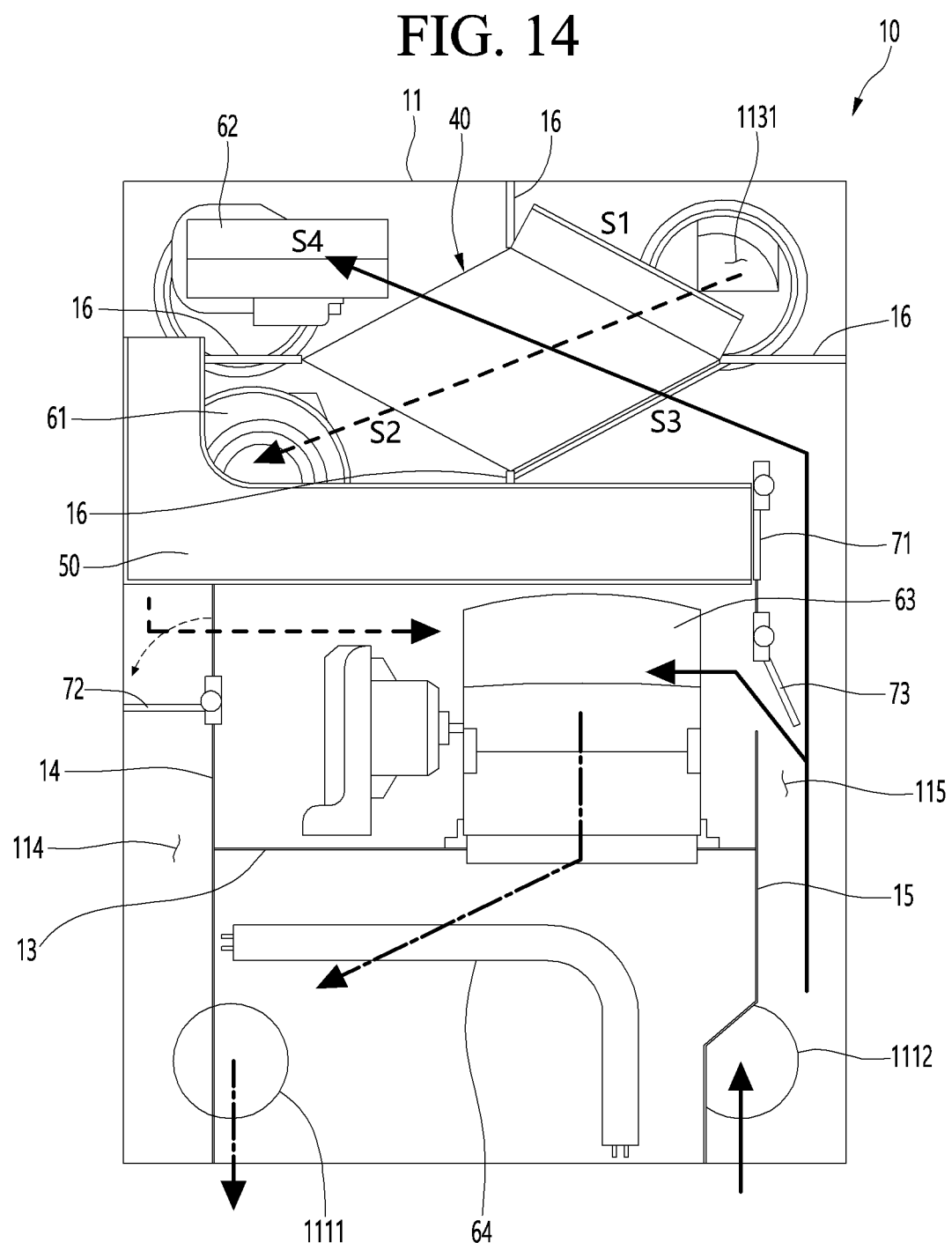
FIG. 14 is a view showing air flow inside the ventilation apparatus in a total heat exchange ventilation/mixed cooling mode.

FIG. 14 is a view showing air flow inside the ventilation apparatus in a total heat exchange ventilation/mixed cooling mode.

Referring to FIG. 14, the total heat exchange ventilation/mixed cooling mode is the same as the total heat exchange ventilation/outdoor air cooling simultaneous mode described with reference to FIG. 11, except that the exhaust damper 73 is switched at an angle less than 90 degrees so that the indoor air introduced through the indoor air inlet duct 33 flows into the total heat exchanger 41 and the upper space 116.

When the total heat exchange ventilation/mixed cooling mode is executed, the outdoor air sucked by fan module 61 flows along the indoor air discharge passage 115 and then flows into the bypass passage 502 and the upper space 116. The indoor air flowing into the upper space 116 is guided to the lower space 117 by the evaporation fan module 63. The indoor air guided to the lower space 117 is cooled while passing through the evaporator 64 and is then supplied to the indoor space through the outdoor air discharge duct 32.

In the total heat exchange ventilation/mixed cooling mode operation, waste heat recovery occurs when the introduced outdoor air and the discharged indoor air exchange heat in the total heat exchanger 41. Accordingly, there is an advantage in that a load is less applied to the evaporator 64. In addition, since the introduced outdoor air and the discharged indoor air are cooled while passing through the evaporator 64, there is an effect that the indoor temperature is lowered to the set temperature in a short time.

Figure 15:
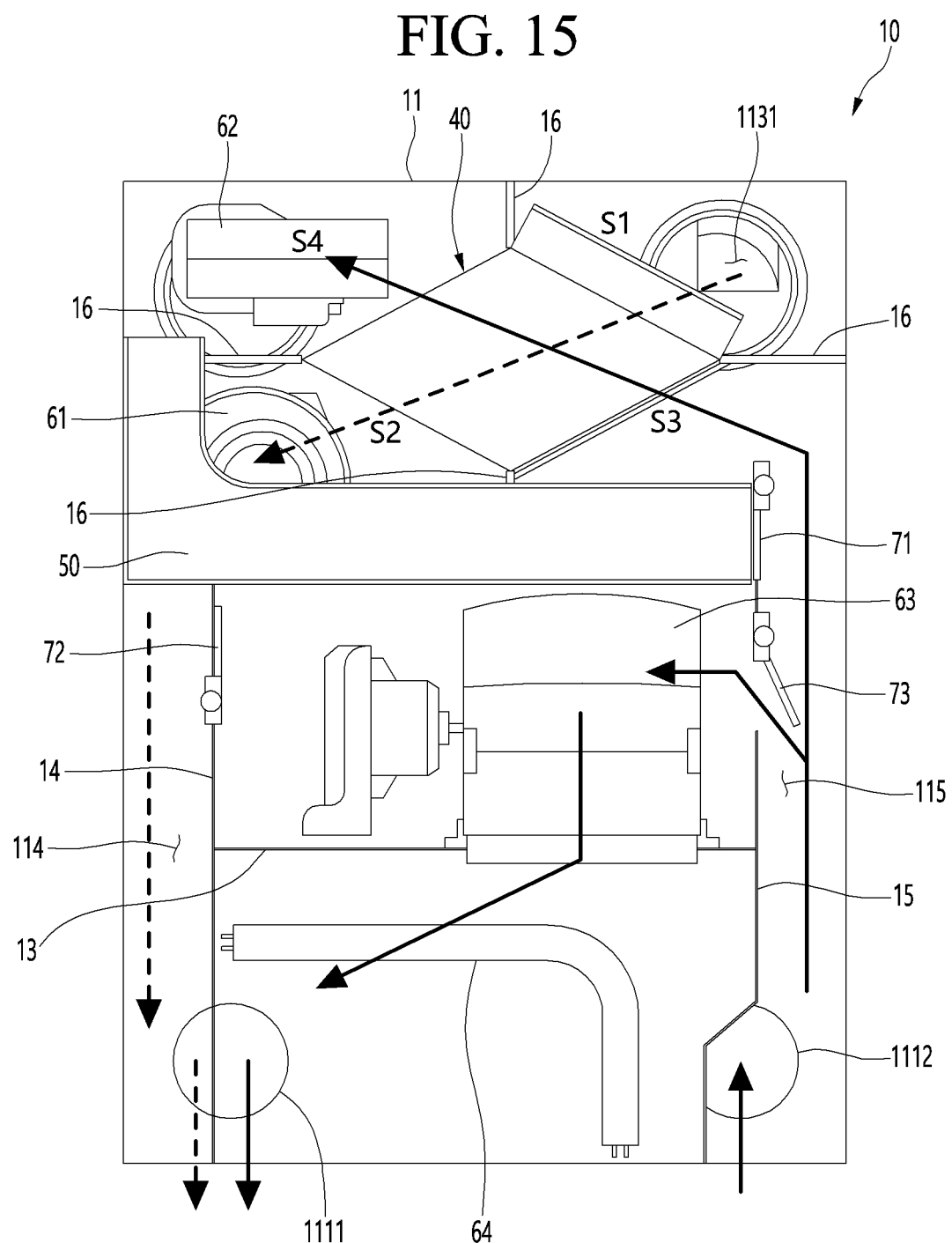
FIG. 15 is a view showing air flow inside the ventilation apparatus in a total heat exchange ventilation/quick cooling mixed mode.

FIG. 15 is a view showing air flow inside the ventilation apparatus in a total heat exchange ventilation/quick cooling mixed mode.

Referring to FIG. 15, the total heat exchange ventilation/quick cooling mixed mode is the same as the total heat exchange ventilation mode described with reference to FIG. 8, except that a part of the discharged indoor air is branched into the upper space 116 of the air conditioning portion 11b, is cooled while passing through the evaporator 64, and is then supplied back into the indoor space.

In detail, the total heat exchange ventilation/outdoor air cooling simultaneous mode of FIG. 11 is an operation mode in which, in the total heat exchange ventilation mode of FIG. 8, only the introduced outdoor air passes through the evaporator 64 and is then supplied to the indoor space, the total heat exchange ventilation/mixed cooling mode of FIG. 14 is a mode in which, in the total heat exchange ventilation mode of FIG. 8, a part of the introduced outdoor air and the discharged indoor air pass through the evaporator 64 and is then supplied to the indoor space, and the total heat exchange ventilation/quick cooling mixed mode of FIG. 15 is a mode in which, in the total heat exchange ventilation mode of FIG. 8, only a part of the discharged indoor air passes through the evaporator 64 and is then supplied to the indoor space.

Figure 16:
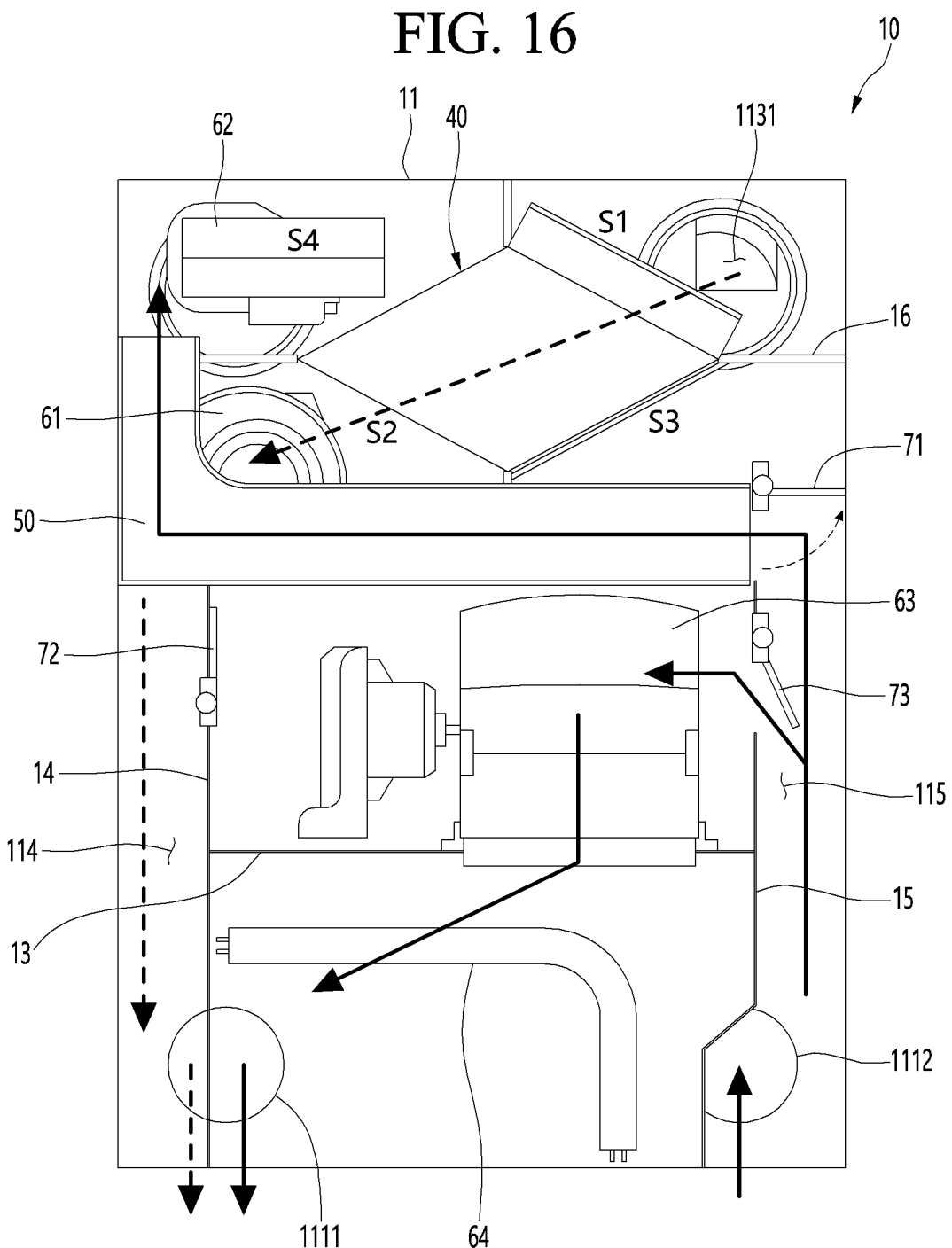
FIG. 16 is a view showing air flow inside the ventilation apparatus in a quick ventilation/quick cooling mixed mode.

FIG. 16 is a view showing air flow inside the ventilation apparatus in a quick ventilation/quick cooling mixed mode.

Referring to FIG. 16, the quick ventilation/quick cooling mixed mode is the same as the quick ventilation mode described with reference to FIG. 9, except that a part of the discharged indoor air is branched into the upper space 116 of the air conditioning portion 11b, is cooled while passing through the evaporator 64, and is then supplied back into the indoor space.

In detail, the quick ventilation/outdoor air cooling simultaneous mode of FIG. 12 is an operation mode in which, in the quick ventilation mode of FIG. 9, only the introduced outdoor air passes through the evaporator 64 and is then supplied to the indoor space, the quick ventilation/mixed cooling mode of FIG. 13 is a mode in which, in the quick ventilation mode of FIG. 9, a part of the introduced outdoor air and the discharged indoor air pass through the evaporator 64 and is then supplied to the indoor space, and the quick ventilation/quick cooling mixed mode of FIG. 16 is a mode in which, in the quick ventilation mode of FIG. 9, only a part of the discharged indoor air passes through the evaporator 64 and is then supplied to the indoor space.

Figure 17:
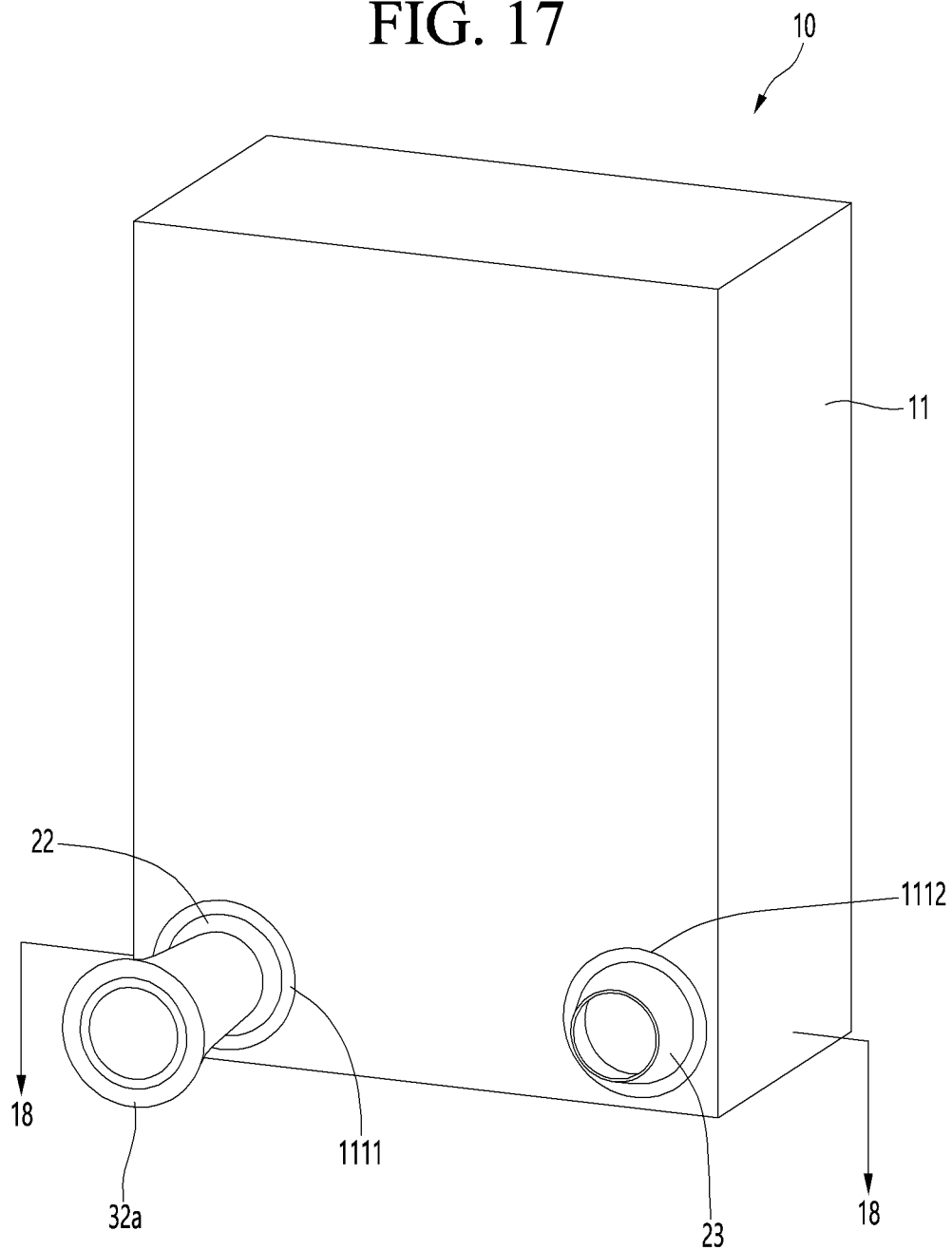
FIG. 17 is a perspective view of a ventilation apparatus provided with an outdoor air discharge duct according to another embodiment of the present disclosure.
Figure 18:
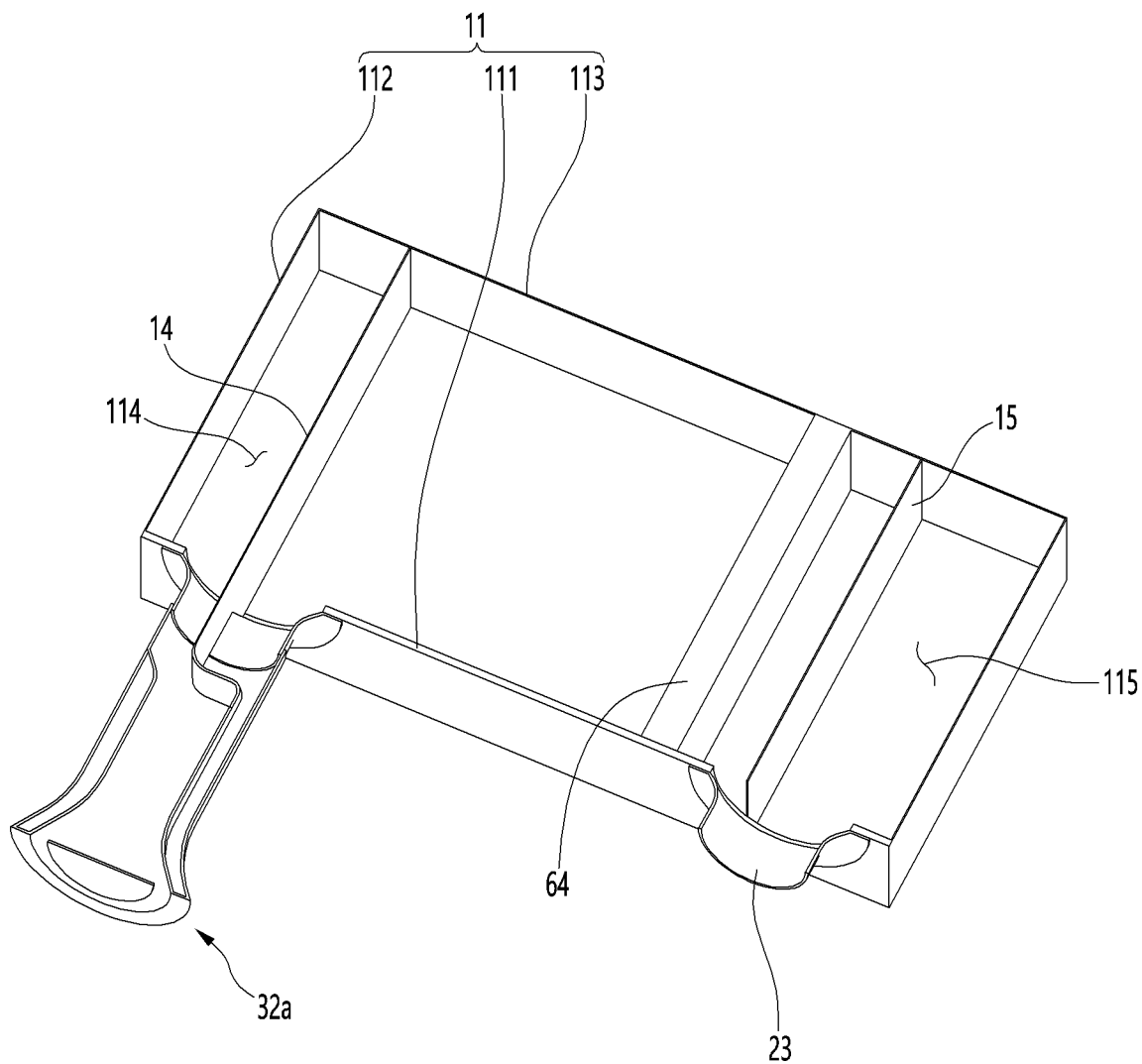
FIG. 18 is a cross-sectional view of the ventilation apparatus taken along line 18-18 of FIG. 17.
Figure 19:
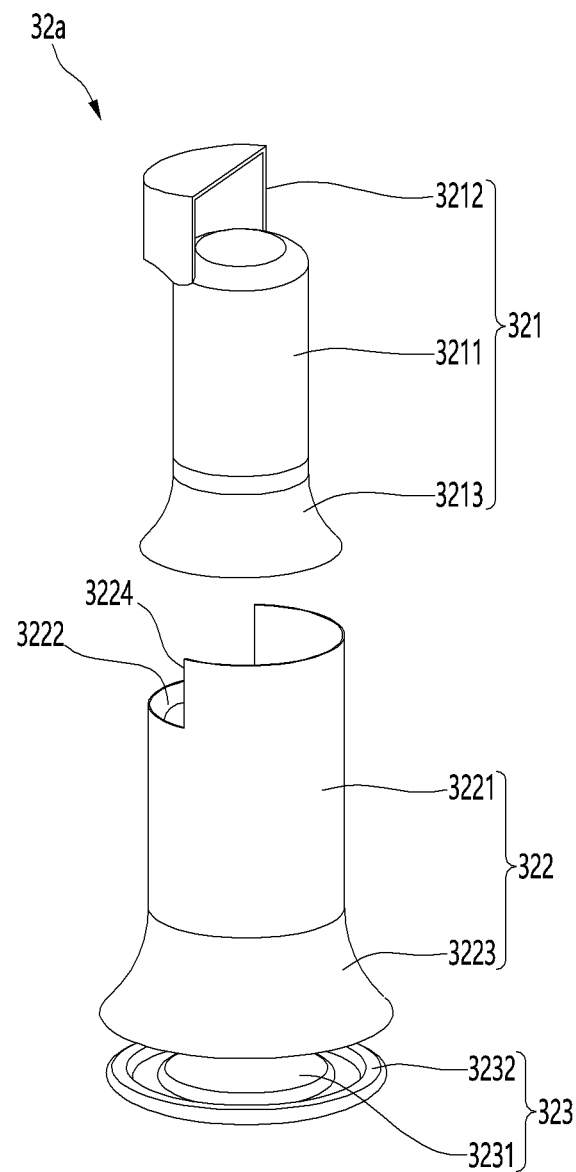
FIG. 19 is an exploded perspective view of the outdoor air discharge duct.
Figure 20:
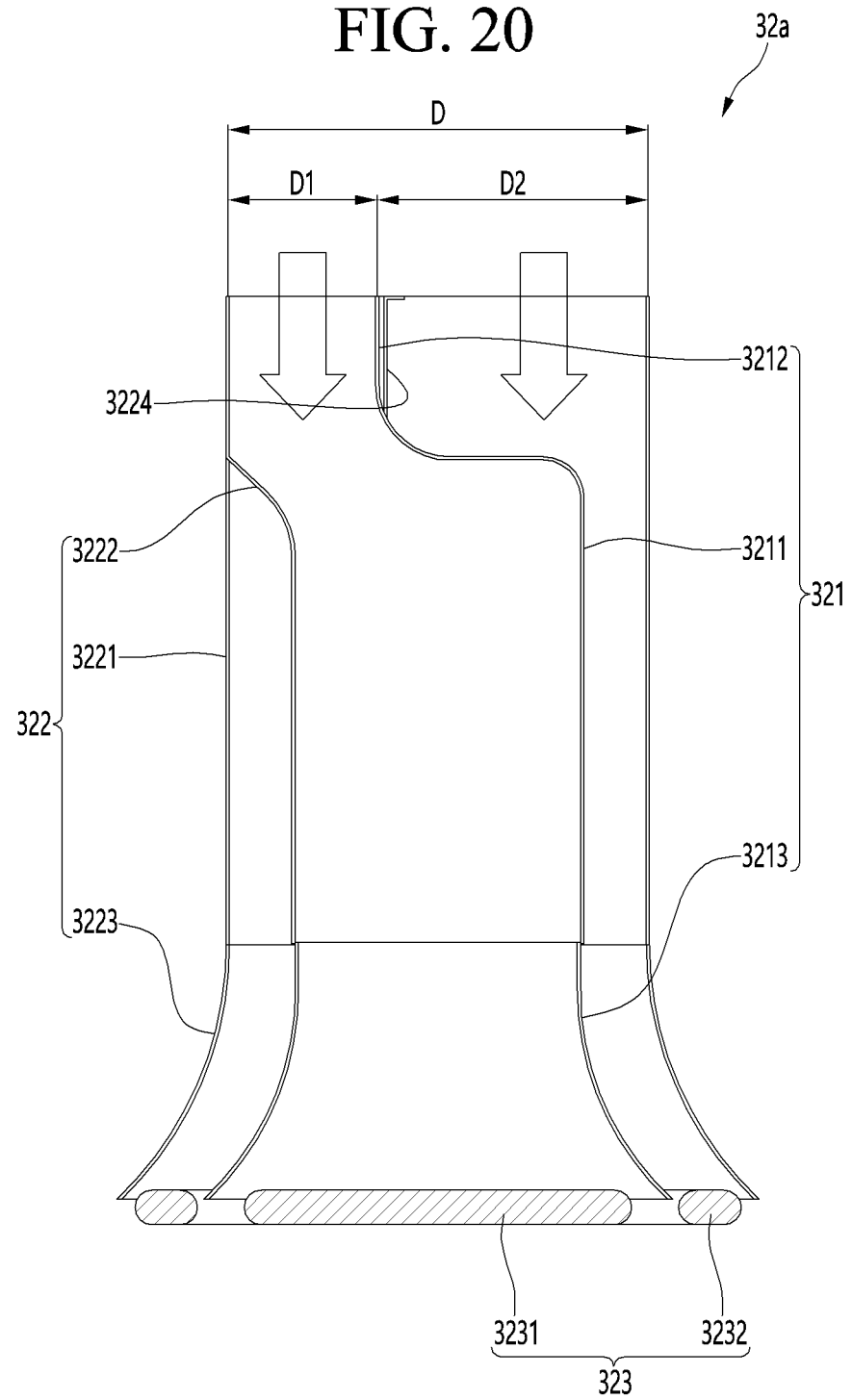
FIG. 20 is a cross-sectional view of the outdoor air discharge duct.

FIG. 17 is a perspective view of a ventilation apparatus provided with an outdoor air discharge duct according to another embodiment of the present disclosure, FIG. 18 is a cross-sectional view of the ventilation apparatus taken along line 18-18 of FIG. 17, FIG. 19 is an exploded perspective view of the outdoor air discharge duct, and FIG. 20 is a cross-sectional view of the outdoor air discharge duct.

Referring to FIGS. 17 to 20, an outdoor air outlet 1111 is formed over an outdoor air supply passage 114 and a lower space 117 of an air conditioning portion 11b. In other words, a supply-side mullion 14 partitions the outdoor air outlet 1111 into a left discharge space and a right discharge space.

An outdoor air discharge duct 32a according to this embodiment looks like a single duct, but is a double duct including an inner duct 321 through which outdoor air passing through a total heat exchanger 41 flows, and an outer duct 322 through which indoor and/or outdoor air passing through the lower space 117 flows.

That is, two passages including an inner passage through which outdoor air passing through the total heat exchanger 41 flows and an outer passage through which indoor and/or outdoor air passing through the evaporator 64 flows are formed inside the outdoor air discharge duct 32a.

Since the inner passage and the outer passage can be opened or closed independently, a ventilation function of supplying only outdoor air to the indoor space and a cooling function of supplying indoor and/or outdoor air passing through the evaporator to the indoor space are separable.

In detail, the outdoor air discharge duct 32a includes an outer duct 322, an inner duct 321 inserted into the interior of the outer duct 322, and a discharge cover 323 mounted on the discharge ends of the outer duct 322 and the inner duct 321.

The outer duct 322 includes an outer duct body 3221 having a cylindrical shape, an outer diffuser 3223 extending from the discharge side end of the outer duct body 3221, and an outer discharge cover 3232 for opening or closing the outer diffuser 3223.

The inner duct 321 includes an inner duct body 3211 having a smaller diameter than the outer duct body 3221, a guide duct 3212 extending from the inlet side end of the inner duct body 3211, an inner diffuser 3213 extending from the discharge side end of the inner duct body 3211, and an inner discharge cover 3231 for opening or closing the inner diffuser 3213.

The guide duct 3212 has a semi-cylindrical shape, and a radius D1 of the guide duct 3212 is designed to be smaller than a diameter D and a radius D2 of the outer duct body 3221. However, the radius of the guide duct 3212 may be appropriately set according to design conditions, that is, the formation position of the outdoor air outlet 1111. For example, when the location of the outdoor air outlet 1111 is set so that the center of the outdoor air outlet 1111 is located on the supply-side mullion 14, the radius of the guide duct 3212 may be formed to have the same size as the radius of the outer duct body 3221.

The inlet end of the guide duct 3212 may have the same shape as the cross-sectional shape of the outdoor air discharge flange 22 communicating with the outdoor air supply passage 114. Specifically, as shown in FIG. 18, the arc portion of the guide duct 3212 is fitted to the outer circumferential surface of the outdoor air discharge flange 22 and the diameter portion of the guide duct 3212 is in contact with the front end of the supply-side mullion 14, so that only outdoor air flowing along the outdoor air supply passage 114 is introduced into the guide duct 3212.

A portion where the guide duct 3212 and the inner duct body 3211 meet each other is formed to be rounded with a predetermined curvature, thereby minimizing the flow resistance of the outdoor air introduced into the guide duct 3212.

On the other hand, the outer circumferential surface of the inner duct body from the inner circumferential surface of the outer duct body 3221, so that the air introduced into the outer duct body 3221 flows uniformly throughout the inner space of the outer duct body 3221 excluding the inner duct body 3211.

A cutout portion 3224 is formed at the inlet side end of the outer duct body 3221 so that the guide duct 3212 is seated thereon, and a seating surface 3222 is formed at the end of the cutout portion 3224. The seating surface 3222 is a portion on which the outlet side end of the guide duct 3212 is seated. The seating surface 3222 is formed to be rounded with a curvature corresponding to the curvature of the outlet side end of the guide duct 3212, thereby minimizing a phenomenon in which air introduced into the outer duct body 3221 leaks into a contact portion between the guide duct 3212 and the outer duct body 3221.

On the other hand, the outer discharge cover 3232 may have a ring shape, and the inner discharge cover 3231 may have a circular shape. The width of the outer discharge cover 3232 may be set as a value obtained by subtracting the radius of the outlet end of the inner diffuser 3213 from the radius of the outlet end of the outer diffuser 3223.

On the other hand, a ventilation apparatus according to another embodiment of the present disclosure includes: a housing including a front cover, a rear cover, and a side cover configured to connect edges of the front cover and the rear cover; a separation wall configured to separate an inner space of the housing into an upper ventilation portion and a lower air conditioning portion; a ventilation component installed in the ventilation portion; and an air conditioning component installed in the air conditioning portion, wherein the front cover includes: an indoor air inlet through which indoor air is introduced; and an air discharge opening through which indoor air and/or outdoor air is discharged, wherein the rear cover includes: an outdoor air inlet through which outdoor air is introduced; and an indoor air outlet through which indoor air is discharged, wherein the ventilation apparatus further includes: a supply-side mullion erected at a position close to one inner side end of the air conditioning portion; and a discharge-side mullion erected at a position close to the other inner side end of the air conditioning portion, wherein the inside of the air conditioning portion is divided into: an outdoor air supply passage formed between the supply-side mullion and one side surface of the side cover close to the supply-side mullion; an indoor air discharge passage formed between the discharge-side mullion and the other side surface of the side cover close to the discharge-side mullion; and an air conditioning passage formed between the supply-side mullion and the discharge-side mullion, wherein the air discharge opening is divided into a first portion communicating with the outdoor r air supply passage and a second portion communicating with the air conditioning passage by the supply-side mullion, and wherein a discharge duct through which air discharged from the outdoor air supply passage and air discharged from the air conditioning passage flow in a separated state is mounted in the air discharge opening.

The discharge duct includes: an inner duct having an inlet connected to the first portion; and an outer duct configured to accommodate the inner duct and having an inlet connected to the second portion.

The inner duct includes: a guide duct having one end connected to the first portion and extending in a semi-cylindrical shape; a cylindrical inner duct body extending from the other end of the guide duct; and an inner diffuser extending in a shape in which a diameter thereof increases from an end of the inner duct body.

The external duct includes: a cylindrical outer duct body having one end at which a cutout portion into which the guide duct is inserted is formed, and connected to the second portion; and an inner diffuser extending in a shape in which a diameter thereof increases from the other end of the outer duct body.

The inner diameter of the outer duct body is formed to be larger than the outer diameter of the inner duct body, and air passing through the second portion flows into a space between the inner duct body and the outer duct body.

The discharge duct includes: a circular inner discharge cover configured to shield an outlet of the inner diffuser; and a ring-shaped outer discharge cover configured to shield a space between the outer diffuser and the inner diffuser.

The ventilation component includes: a hexahedral total heat exchanger disposed inside the ventilation portion in a front-and-rear direction so that an upper surface and a lower surface thereof are in close contact with the front cover and the rear cover, respectively; a plurality of partition walls extending from four side corners of the total heat exchanger to partition an inner space of the ventilation portion into four spaces; an exhaust fan module disposed in one of the four spaces; and a suction fan module disposed in another one of the four spaces.

The four spaces include: an outdoor air inlet space communicating with the outdoor air inlet; an outdoor air discharge space defined on an opposite side of the outdoor air inlet space with respect to the total heat exchanger and communicating with the outdoor air inlet; an indoor air discharge space communicating with the indoor air outlet; and an indoor air inlet space defined on an opposite side of the indoor air discharge space with respect to the total heat exchanger and communicating with the indoor air discharge space, wherein the exhaust fan module is disposed in the indoor air discharge space and has an outlet connected to the indoor air outlet, and wherein the suction fan module is disposed in the outdoor air discharge space.

The ventilation apparatus according to the present disclosure further includes a separation plate configured to connect the supply-side mullion and the discharge-side mullion to separate an inner space of the air conditioning portion into an upper space and a lower space, wherein the air conditioning component includes: an evaporation fan module disposed in the upper space; and an evaporator disposed in the lower space.

The outdoor air introduced into the outdoor air inlet sequentially passes through the outdoor air inlet space, the total heat exchange element, the outdoor air discharge space, the suction fan module, the outdoor air supply passage, the first portion, and the inner duct and is supplied to the indoor space.

The ventilation apparatus according to the present disclosure further includes: a supply damper provided on the supply-side mullion; and an exhaust damper provided on the discharge-side mullion, wherein the indoor air introduced into the air conditioning passage through the control of the opening degree of the exhaust damper and/or the outdoor air introduced into the air conditioning passage through the control of the opening degree of the supply damper sequentially pass through the second portion and the outer duct and are supplied to the indoor space.

The indoor air introduced into the indoor air inlet sequentially passes through the indoor air discharge passage, the indoor air inlet space, the total heat exchange element, the indoor air discharge space, and the indoor air outlet and is discharged to the outside.

A ventilation apparatus according to still another embodiment of the present disclosure includes: a housing including a front cover, a rear cover, and a side cover configured to connect edges of the front cover and the rear cover; a separation wall configured to separating an inner space of the housing into an upper ventilation portion and a lower air conditioning portion; a ventilation component installed in the ventilation portion; and an air conditioning component installed in the air conditioning portion, wherein the front cover includes: an indoor air inlet through which: indoor air is introduced; and an air discharge opening through which indoor air and/or outdoor air is discharged, and wherein the rear cover includes: an outdoor air inlet through which outdoor air is introduced; and an indoor air outlet through which indoor air is discharged, wherein the ventilation component includes: a hexahedral total heat exchanger disposed inside the ventilation portion in a front-and-rear direction so that an upper surface and a lower surface thereof are in close contact with the front cover and the rear cover, respectively; a plurality of partition walls extending from four side corners of the total heat exchanger to partition an inner space of the ventilation portion into four spaces; an exhaust fan module disposed in one of the four spaces; a suction fan module disposed in another one of the four spaces; and a bypass duct configured to bypass the total heat exchanger to guide indoor air introduced into the indoor air inlet to the air discharge opening.

The four spaces include: an outdoor air inlet space communicating with the outdoor air inlet; an outdoor air discharge space defined on an opposite side of the outdoor air inlet space with respect to the total heat exchanger and communicating with the outdoor air inlet; an indoor air discharge space communicating with the indoor air outlet; and an indoor air inlet space defined on an opposite side of the indoor air discharge space with respect to the total heat exchanger and communicating with the indoor air discharge space, wherein the exhaust fan module is disposed in the indoor air discharge space and has an outlet connected to the indoor air outlet.

The ventilation apparatus according to the present disclosure further includes: a supply-side mullion erected at a position close to one inner side end of the air conditioning portion; and a discharge-side mullion erected at a position close to the other inner side end of the air conditioning portion, wherein an outdoor air supply passage is defined between the supply-side mullion and one side surface of the side cover close to the supply-side mullion, and wherein an indoor air discharge passage is defined between the discharge-side mullion and the other side surface of the side cover close to the discharge-side mullion, and wherein an outdoor air communication hole is formed at one position of the separation wall partitioning the outdoor air supply passage and the outdoor air discharge space.

The suction fan module is disposed in the outdoor air discharge space, and an outlet of the suction fan module is connected to the outdoor air communication hole.

A bypass passage having an inlet communicating with the indoor air inlet space and an outlet communicating with the indoor air discharge space is formed inside the bypass duct.

The ventilation apparatus according to the present disclosure further includes a bypass damper configured to selectively open or close the inlet of the bypass passage.

The bypass duct includes: a transverse portion disposed on the separation wall and having an inlet formed at one side end; a side portion extending upward from the other side end of the transverse portion; and an upper portion formed on the upper end of the side portion and having the outlet formed therein.

The bypass passage is defined by a flow guide formed at a position spaced apart from the front side of the bypass duct and the front side of the bypass duct, and the flow guide includes: a first guide extending from the rear end of the inlet toward the front end of the bypass duct; a second guide bent from the end of the first guide and extending toward the side portion; and a third guide extending roundly from the end of the second guide toward the upper rear side.

The bypass passage includes a suction area defined by the inlet and the first guide, a transfer area extending from the suction area over the indoor air inlet space and the outdoor air discharge space, and a discharge area extending from the end of the transfer area to the outlet.

An indoor air communication hole is formed at one position of the separation wall partitioning the indoor air discharge passage and the indoor air inlet space, and the opening degree of the bypass damper is controlled so that the indoor air passing through the indoor air communication hole is guided to one of the indoor air inlet space and the bypass passage.

The ventilation apparatus according to the present disclosure further includes a separation plate configured to connect the supply-side mullion and the discharge-side mullion, wherein the air conditioning component includes an evaporation fan module disposed in a space above the separation plate, and an evaporator disposed in a space below the separation plate.

What is claimed is:

1. A ventilation apparatus comprising:
    a housing defining an inner space, the housing including:
    a front surface having an indoor air inlet and an air discharge opening; and
    a rear surface having an outdoor air inlet and an indoor air outlet;
    a separation wall configured to divide the inner space of the housing into a ventilation portion and an air conditioning portion, the separation wall having an indoor air communication hole and an outdoor air communication hole;
    a total heat exchanger located in the ventilation portion, the total heat exchanger having a hexahedral shape such that a front surface of the total heat exchanger contacts the front surface of the housing and a rear surface of the total heat exchanger contacts the rear surface of the housing;
    an inner space of the ventilation portion being partitioned into a space for the total heat exchanger, an outdoor air inlet space, an outdoor air discharge space, an indoor air inlet space, and an indoor air discharge space;
    a suction fan disposed in the outdoor air discharge space, the suction fan having an outlet connected to the outdoor air communication hole;
    an exhaust fan disposed in the indoor air discharge space, the exhaust fan having an outlet connected to the indoor air outlet;
    a bypass duct having a bypass passage configured to bypass the total heat exchanger, the bypass passage having an inlet communicating with the indoor air inlet space and an outlet communicating with the indoor air discharge space;
    a supply-side mullion provided in the air conditioning portion and located adjacent the outdoor air communication hole, the supply-side mullion defining an outdoor air supply passage communicating with the outdoor air communication hole;
    a discharge-side mullion provided in the air conditioning portion and located adjacent to the indoor air communication hole, the discharge-side mullion defining an indoor air discharge passage communicating with the indoor air communication hole;
    an air conditioning passage defined between the supply-side mullion and the discharge-side mullion;
    an evaporator disposed in the air conditioning passage;
    an evaporation fan disposed in the air conditioning passage;
    a supply damper provided on the supply-side mullion, the supply damper being configured to direct outdoor air passing through the outdoor air communication hole to flow to the outdoor air supply passage or to the air conditioning passage;
    an exhaust damper provided on the discharge-side mullion, the exhaust damper being configured to direct indoor air flowing along the indoor air discharge passage to flow to the indoor air communication hole, to the air conditioning passage, or to both the indoor air communication hole and the air conditioning passage; and
    a bypass damper mounted at the inlet of the bypass passage to direct indoor air passing through the indoor air communication hole to flow to one of the indoor air inlet space and the bypass passage,
    wherein the air discharge opening communicates with both the outdoor air supply passage and the air conditioning passage, and
    wherein indoor air passing through the indoor air communication hole passes through at least one of the total heat exchanger and the bypass passage according to an operation mode of the ventilation apparatus.

2. The ventilation apparatus of claim 1, wherein the operation mode is a quick ventilation/mixed cooling mode, the quick ventilation/mixed cooling mode being configured such that:
    the suction fan, the exhaust fan, the evaporation fan, and the evaporator are operated,
    an opening degree of the exhaust damper is adjusted such that a first part of the indoor air passing through the indoor air discharge passage passes into the air conditioning passage and a second part of the indoor air passing through the indoor air discharge passage passes through the indoor air communication hole,
    the bypass damper is opened such that the second part of the indoor air passing through the indoor air communication hole passes through the bypass passage and the indoor air outlet,
    the supply damper is opened such that the outdoor air passing through the outdoor air inlet sequentially passes through the outdoor air inlet space, the total heat exchanger, the indoor air discharge space, the suction fan, the outdoor air communication hole, and the air conditioning passage, and
    the first part of the indoor air and the outdoor air passing through the air conditioning passage together sequentially pass through the evaporation fan, the evaporator, and the air discharge opening.

3. The ventilation apparatus of claim 1, wherein the operation mode is a quick cooling mode, the quick cooling mode being configured such that:
    the evaporation fan and the evaporator are operated,
    the suction fan and the exhaust fan are not operated, and
    an opening degree of the exhaust damper is adjusted such that all of the indoor air passing through the indoor air discharge passage sequentially passes through the evaporation fan, the evaporator, and the air discharge opening.

4. The ventilation apparatus of claim 1, wherein the operation mode is a quick ventilation mode, the quick ventilation mode being configured such that:

the suction fan and the exhaust fan are operated;
the evaporation fan is not operated,
the supply damper is closed such that the outdoor air passing through the outdoor air inlet sequentially passes through the outdoor air inlet space, the total heat exchanger, the indoor air discharge space, the suction fan, the outdoor air communication hole, the outdoor air supply passage, and the air discharge opening, and
the exhaust damper is closed and the bypass damper is opened such that all of the indoor air passing through the indoor air discharge passage sequentially passes through the indoor air communication hole, the bypass passage, the exhaust fan and the indoor air outlet.

5. The ventilation apparatus of claim 1, wherein the operation mode is a quick ventilation/outdoor air cooling simultaneous mode, the quick ventilation/outdoor air cooling simultaneous mode being configured such that:
the suction fan, the exhaust fan, the evaporation fan, and the evaporator are operated,
the exhaust damper is closed and the bypass damper is opened such that all of the indoor air passing through the indoor air discharge passage sequentially passes through the indoor air communication hole, the bypass passage, the exhaust fan and the indoor air outlet, and
the supply damper is opened such that the outdoor air passing through the outdoor air inlet sequentially passes through the outdoor air inlet space, the total heat exchanger, the indoor air discharge space, the suction fan, the outdoor air communication hole, the air conditioning passage, the evaporation fan, the evaporator, and the air discharge opening.

6. The ventilation apparatus of claim 1, wherein the operation mode is a quick ventilation/quick cooling mixed mode, the quick ventilation/mixed cooling mode being configured such that:
the suction fan, the exhaust fan, the evaporation fan, and the evaporator are operated,
an opening degree of the exhaust damper is adjusted such that a first part of the indoor air passing through the indoor air discharge passage passes into the air conditioning passage and a second part of the indoor air passing through the indoor air discharge passage passes through the indoor air communication hole,
the bypass damper is opened such that the second part of the indoor air passing through the indoor air communication hole passes through the bypass passage, the exhaust fan and the indoor air outlet,
the supply damper is closed such that the outdoor air passing through the outdoor air inlet sequentially passes through the outdoor air inlet space, the total heat exchanger, the indoor air discharge space, the suction fan, the outdoor air communication hole, the outdoor air supply passage, and the air discharge opening, and
the first part of the indoor air passing through the air conditioning passage sequentially passes through the evaporation fan, the evaporator, and the air discharge opening.

7. The ventilation apparatus of claim 1, wherein the operation mode is a total heat exchange ventilation/mixed cooling mode, the total heat exchange ventilation/mixed cooling mode being configured such that:
the suction fan, the exhaust fan, the evaporation fan, and the evaporator are operated,
an opening degree of the exhaust damper is adjusted such that a first part of the indoor air passing through the indoor air discharge passage passes into the air conditioning passage and a second part of the indoor air passing through the indoor air discharge passage passes through the indoor air communication hole,
the bypass damper is closed such that the second part of the indoor air passing through the indoor air communication hole sequentially passes through the indoor air inlet space, the total heat exchanger, the exhaust fan, and the indoor air outlet,
the supply damper is opened such that the outdoor air passing through the outdoor air inlet sequentially passes through the outdoor air inlet space, the total heat exchanger, the indoor air discharge space, the suction fan, the outdoor air communication hole, and the air conditioning passage, and
the first part of the indoor air and the outdoor air passing through the air conditioning passage together sequentially pass through the evaporation fan, the evaporator, and the air discharge opening.

8. The ventilation apparatus of claim 1, wherein the operation mode is a total heat exchange ventilation/quick cooling mixed mode, the total heat exchange ventilation/quick cooling mixed mode being configured such that:
the suction fan, the exhaust fan, the evaporation fan, and the evaporator are operated,
an opening degree of the exhaust damper is adjusted such that a first part of the indoor air passing through the indoor air discharge passage passes into the air conditioning passage and a second part of the indoor air passing through the indoor air discharge passage passes through the indoor air communication hole,
the bypass damper is closed such that the second part of the indoor air passing through the indoor air communication hole sequentially passes through the indoor air inlet space, the total heat exchanger, the exhaust fan, and the indoor air outlet,
the supply damper is closed such that the outdoor air passing through the outdoor air inlet sequentially passes through the outdoor air inlet space, the total heat exchanger, the indoor air discharge space, the suction fan, the outdoor air communication hole, the outdoor air supply passage, and the air discharge opening, and
the first part of the indoor air passing through the air conditioning passage sequentially passes through the evaporation fan, the evaporator, and the air discharge opening.

9. The ventilation apparatus of claim 1, wherein the operation mode is a total heat exchange ventilation/outdoor air cooling simultaneous mode, the total heat exchange ventilation/outdoor air cooling simultaneous mode being configured such that:
the suction fan, the exhaust fan, the evaporation fan, and the evaporator are operated,
the supply damper is opened such that the outdoor air passing through the outdoor air inlet sequentially passes through the outdoor air inlet space, the total heat exchanger, the indoor air discharge space, the suction fan, the outdoor air communication hole, the air conditioning passage, the evaporation fan, the evaporator, and the air discharge opening, and
the exhaust damper and the bypass damper are closed such that all of the indoor air passing through the indoor air discharge passage sequentially passes through the indoor air communication hole, the indoor air inlet space, the total heat exchanger, the exhaust fan, and the indoor air outlet.

10. The ventilation apparatus of claim 1, wherein the operation mode is a total heat exchange ventilation mode, the total heat exchange ventilation mode being configured such that:

the suction fan and the exhaust fan are operated,
the evaporation fan and the evaporator are not operated,
the supply damper is closed such that the outdoor air passing through the outdoor air inlet sequentially passes through the outdoor air inlet space, the total heat exchanger, the indoor air discharge space, the suction fan, the outdoor air communication hole, the outdoor air supply passage, and the air discharge opening, and
the exhaust damper and the bypass damper are closed such that all of the indoor air passing through the indoor air discharge passage sequentially passes through the indoor air communication hole, the indoor air inlet space, the total heat exchanger, the exhaust fan, and the indoor air outlet.

11. The ventilation apparatus of claim 1, further comprising a plurality of partition walls extending from four side edges of the total heat exchanger to partition the inner space of the ventilation portion excluding the space for the total heat exchanger into the outdoor air inlet space, the outdoor air discharge space, the indoor air inlet space, and the indoor air discharge space.

12. The ventilation apparatus of claim 11, wherein the supply-side mullion and the discharge-side mullion extend vertically.

13. The ventilation apparatus of claim 11, wherein the ventilation portion is located above the air conditioning portion.

14. The ventilation apparatus of claim 11, wherein the indoor air inlet and the air discharge opening are located below the separation wall.

15. The ventilation apparatus of claim 14, wherein the outdoor air inlet and the indoor air outlet are located above the separation wall.

16. The ventilation apparatus of claim 15, further comprising an air duct connected to each of the indoor air inlet, the air discharge opening, the outdoor air inlet, and the indoor air outlet.

17. The ventilation apparatus of claim 1, further comprising an outdoor air discharge duct in communication with the air discharge opening, the outdoor air discharge duct having an outer duct and an inner duct located within the outer duct.

18. The ventilation apparatus of claim 17, wherein the outdoor air discharge duct further includes a discharge cover mounted on discharge ends of the outer duct and the inner duct.

19. The ventilation apparatus of claim 1, wherein the supply-side mullion and the discharge-side mullion extend vertically.

20. The ventilation apparatus of claim 1, wherein the ventilation portion is located above the air conditioning portion.

* * * * *